United States Patent
Arnold et al.

(10) Patent No.: US 7,319,565 B2
(45) Date of Patent: Jan. 15, 2008

(54) SILICONE RUBBER SURFACES FOR BIOMETRIC PRINT TIR PRISMS

(75) Inventors: Joe F. Arnold, Palm Beach Gardens, FL (US); Charles P. Bardons, Palm Beach Gardens, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 98 days.

(21) Appl. No.: 11/356,036

(22) Filed: Feb. 17, 2006

(65) Prior Publication Data

US 2006/0139778 A1    Jun. 29, 2006

Related U.S. Application Data

(62) Division of application No. 10/132,719, filed on Apr. 26, 2002, now abandoned.

(60) Provisional application No. 60/292,341, filed on May 22, 2001, provisional application No. 60/286,373, filed on Apr. 26, 2001.

(51) Int. Cl.
*G02B 5/04* (2006.01)
*G06K 9/00* (2006.01)

(52) U.S. Cl. .................. 359/831; 359/833; 356/71; 382/115; 382/127; 428/425.5

(58) Field of Classification Search ........... 359/831, 359/833, 837; 356/71, 446; 382/115, 124, 382/125, 127; 428/425.5, 447
See application file for complete search history.

(56) References Cited

U.S. PATENT DOCUMENTS

| | | | |
|---|---|---|---|
| 2,167,716 A * | 8/1939 | Harkins | .................. 428/466 |
| 2,500,017 A | 3/1950 | Altman | |
| 3,200,701 A | 8/1965 | White | |
| 3,475,588 A | 10/1969 | McMaster | |
| 3,482,498 A | 12/1969 | Becker | |
| 3,495,259 A | 2/1970 | Rocholl et al. | |
| 3,527,535 A | 9/1970 | Monroe | |
| 3,540,025 A | 11/1970 | Levin et al. | |
| 3,617,120 A | 11/1971 | Roka | |

(Continued)

FOREIGN PATENT DOCUMENTS

EP    0 101 772 A1    3/1984

(Continued)

OTHER PUBLICATIONS

Roethenbaugh, G., Biometrics Explained, International Computer Security Association, ICSA, Inc., 1998, pp. 1-34.

(Continued)

*Primary Examiner*—Ricky D. Shafer
(74) *Attorney, Agent, or Firm*—Sterne, Kessler, Goldstein & Fox PLLC

(57) ABSTRACT

Molded silicone rubber sheets with optical quality surfaces and methods for making the same. The silicone rubber sheets are made by molding liquid silicone rubber in a mold. In embodiments, the mold forms parallel optical quality flat surfaces. In one embodiment, a stiffening plastic is molded in the middle of the silicone rubber sheet between the parallel optical quality flat surfaces. In another embodiment, the mold forms one optical quality flat surface while the surface parallel to the optical quality flat surface is bonded to a prism.

5 Claims, 11 Drawing Sheets

U.S. PATENT DOCUMENTS

| | | |
|---|---|---|
| 3,699,519 A | 10/1972 | Campbell |
| 3,716,301 A | 2/1973 | Caulfield et al. |
| 3,802,952 A * | 4/1974 | Gurin et al. ............... 428/215 |
| 3,906,520 A | 9/1975 | Phillips |
| 3,947,128 A | 3/1976 | Weinberger et al. |
| 3,968,476 A | 7/1976 | McMahon |
| 3,975,711 A | 8/1976 | McMahon |
| 3,982,836 A | 9/1976 | Green et al. |
| 4,032,975 A | 6/1977 | Malueg et al. |
| 4,063,226 A | 12/1977 | Kozma et al. |
| 4,120,585 A | 10/1978 | DePalma et al. |
| 4,152,056 A | 5/1979 | Fowler |
| 4,209,481 A | 6/1980 | Kashiro et al. |
| 4,210,899 A | 7/1980 | Swonger et al. |
| 4,253,086 A | 2/1981 | Szwarcbier |
| 4,322,163 A | 3/1982 | Schiller |
| 4,414,684 A | 11/1983 | Blonder |
| 4,537,484 A | 8/1985 | Fowler et al. |
| 4,544,267 A | 10/1985 | Schiller |
| 4,553,837 A | 11/1985 | Marcus |
| 4,601,195 A | 7/1986 | Garritano |
| 4,669,487 A | 6/1987 | Frieling |
| 4,681,435 A | 7/1987 | Kubota et al. |
| 4,684,802 A | 8/1987 | Hakenewerth et al. |
| 4,701,772 A | 10/1987 | Anderson et al. |
| 4,783,823 A | 11/1988 | Tasaki et al. |
| 4,784,484 A | 11/1988 | Jensen |
| 4,792,226 A | 12/1988 | Fishbine et al. |
| 4,811,414 A | 3/1989 | Fishbine et al. |
| 4,830,927 A * | 5/1989 | Fukahori et al. ............ 428/495 |
| 4,831,799 A * | 5/1989 | Glover et al. ................ 52/172 |
| 4,876,726 A | 10/1989 | Capello et al. |
| 4,905,293 A | 2/1990 | Asai et al. |
| 4,924,085 A | 5/1990 | Kato et al. |
| 4,933,976 A | 6/1990 | Fishbine et al. |
| 4,942,482 A | 7/1990 | Kakinuma et al. |
| 4,946,276 A | 8/1990 | Chilcott |
| 4,995,086 A | 2/1991 | Lilley et al. |
| 5,054,090 A | 10/1991 | Knight et al. |
| 5,067,162 A | 11/1991 | Driscoll, Jr. et al. |
| 5,067,749 A | 11/1991 | Land |
| 5,096,290 A * | 3/1992 | Ohta ........................... 356/71 |
| 5,131,038 A | 7/1992 | Puhl et al. |
| 5,146,102 A | 9/1992 | Higuchi et al. |
| 5,157,497 A | 10/1992 | Topper et al. |
| 5,168,385 A * | 12/1992 | Kobayashi et al. ......... 359/209 |
| 5,185,673 A | 2/1993 | Sobol |
| 5,187,747 A | 2/1993 | Capello et al. |
| 5,210,588 A | 5/1993 | Lee |
| 5,222,152 A | 6/1993 | Fishbine et al. |
| 5,222,153 A | 6/1993 | Beiswenger |
| 5,230,025 A | 7/1993 | Fishbine et al. |
| 5,233,404 A | 8/1993 | Lougheed et al. |
| 5,249,370 A | 10/1993 | Stanger et al. |
| 5,253,085 A | 10/1993 | Maruo et al. |
| 5,261,266 A | 11/1993 | Lorenz et al. |
| 5,285,293 A | 2/1994 | Webb et al. |
| 5,291,318 A | 3/1994 | Genovese |
| 5,313,317 A * | 5/1994 | Saburi et al. ................. 359/13 |
| D348,445 S | 7/1994 | Fishbine et al. |
| 5,351,127 A | 9/1994 | King et al. |
| D351,144 S | 10/1994 | Fishbine et al. |
| 5,363,318 A | 11/1994 | McCauley |
| 5,384,621 A | 1/1995 | Hatch et al. |
| 5,412,463 A | 5/1995 | Sibbald et al. |
| 5,416,573 A | 5/1995 | Sartor, Jr. |
| 5,448,649 A | 9/1995 | Chen et al. |
| 5,467,403 A | 11/1995 | Fishbine et al. |
| 5,469,506 A | 11/1995 | Berson et al. |
| 5,471,240 A | 11/1995 | Prager et al. |
| 5,473,144 A | 12/1995 | Mathurin, Jr. |
| 5,483,601 A | 1/1996 | Faulkner |
| 5,509,083 A | 4/1996 | Abtahi et al. |
| 5,517,528 A | 5/1996 | Johnson |
| 5,528,355 A | 6/1996 | Maase et al. |
| 5,548,394 A | 8/1996 | Giles et al. |
| 5,591,949 A | 1/1997 | Bernstein |
| 5,596,454 A | 1/1997 | Hebert |
| 5,598,474 A | 1/1997 | Johnson |
| 5,613,014 A | 3/1997 | Eshera et al. |
| 5,615,277 A | 3/1997 | Hoffman |
| 5,625,448 A | 4/1997 | Ranalli et al. |
| 5,640,422 A | 6/1997 | Johnson |
| 5,649,128 A | 7/1997 | Hartley |
| 5,650,842 A | 7/1997 | Maase et al. |
| 5,661,451 A | 8/1997 | Pollag |
| 5,680,205 A | 10/1997 | Borza |
| 5,689,529 A | 11/1997 | Johnson |
| 5,717,777 A | 2/1998 | Wong et al. |
| 5,729,334 A | 3/1998 | Van Ruyven |
| 5,736,734 A | 4/1998 | Marcus et al. |
| 5,737,071 A * | 4/1998 | Arndt ........................... 356/71 |
| 5,745,684 A | 4/1998 | Oskouy et al. |
| 5,748,766 A | 5/1998 | Maase et al. |
| 5,748,768 A | 5/1998 | Sivers et al. |
| 5,755,748 A | 5/1998 | Borza |
| 5,757,278 A | 5/1998 | Itsumi |
| 5,767,989 A | 6/1998 | Sakaguchi |
| 5,778,089 A | 7/1998 | Borza |
| 5,781,647 A | 7/1998 | Fishbine et al. |
| 5,793,218 A | 8/1998 | Oster et al. |
| 5,801,681 A | 9/1998 | Sayag |
| 5,805,777 A | 9/1998 | Kuchta |
| 5,809,172 A | 9/1998 | Melen |
| 5,812,067 A | 9/1998 | Bergholz et al. |
| 5,815,252 A | 9/1998 | Price-Francis |
| 5,818,956 A | 10/1998 | Tuli |
| 5,822,445 A | 10/1998 | Wong |
| 5,825,005 A | 10/1998 | Behnke |
| 5,825,474 A * | 10/1998 | Maase ........................... 356/71 |
| 5,828,773 A | 10/1998 | Setlak et al. |
| 5,832,244 A | 11/1998 | Jolley et al. |
| 5,848,231 A | 12/1998 | Teitelbaum et al. |
| 5,855,433 A | 1/1999 | Velho et al. |
| 5,859,420 A | 1/1999 | Borza |
| 5,859,710 A | 1/1999 | Hannah |
| 5,862,247 A | 1/1999 | Fisun et al. |
| 5,867,802 A | 2/1999 | Borza |
| 5,869,822 A | 2/1999 | Meadows, II et al. |
| 5,872,834 A | 2/1999 | Teitelbaum |
| 5,892,599 A | 4/1999 | Bahuguna |
| 5,900,993 A | 5/1999 | Betensky |
| 5,907,627 A | 5/1999 | Borza |
| 5,920,384 A | 7/1999 | Borza |
| 5,920,640 A | 7/1999 | Salatino et al. |
| 5,928,347 A | 7/1999 | Jones |
| 5,942,761 A | 8/1999 | Tuli |
| 5,946,135 A | 8/1999 | Auerswald et al. |
| 5,960,100 A | 9/1999 | Hargrove |
| 5,973,131 A | 10/1999 | Schwab |
| 5,974,162 A | 10/1999 | Metz et al. |
| 5,987,155 A | 11/1999 | Dunn et al. |
| 5,991,467 A | 11/1999 | Kamiko |
| 5,995,014 A | 11/1999 | DiMaria |
| 5,999,307 A * | 12/1999 | Whitehead et al. ......... 359/298 |
| 6,018,739 A | 1/2000 | McCoy et al. |
| 6,023,522 A | 2/2000 | Draganoff et al. |
| 6,038,332 A | 3/2000 | Fishbine et al. |
| 6,041,372 A | 3/2000 | Hart et al. |
| 6,055,071 A | 4/2000 | Kuwata et al. |
| 6,064,398 A | 5/2000 | Ellenby et al. |
| 6,064,753 A | 5/2000 | Bolle et al. |
| 6,064,779 A | 5/2000 | Neukermans et al. |
| 6,072,891 A | 6/2000 | Hamid et al. |

| | | | |
|---|---|---|---|
| 6,075,876 A | 6/2000 | Draganoff | |
| 6,078,265 A | 6/2000 | Bonder et al. | |
| 6,088,585 A | 7/2000 | Schmitt et al. | |
| 6,097,873 A | 8/2000 | Filas et al. | |
| 6,104,809 A | 8/2000 | Berson et al. | |
| 6,113,827 A | 9/2000 | Styczynski | |
| 6,115,484 A | 9/2000 | Bowker et al. | |
| 6,122,394 A | 9/2000 | Neukermans et al. | |
| 6,144,408 A | 11/2000 | MacLean | |
| 6,150,665 A | 11/2000 | Suga | |
| 6,154,285 A * | 11/2000 | Teng et al. | 356/445 |
| 6,162,486 A | 12/2000 | Samouilhan et al. | |
| 6,166,787 A | 12/2000 | Akins et al. | |
| 6,178,255 B1 | 1/2001 | Scott et al. | |
| 6,195,447 B1 | 2/2001 | Ross | |
| 6,198,836 B1 | 3/2001 | Hauke | |
| 6,204,331 B1 | 3/2001 | Sullivan et al. | |
| 6,259,108 B1 | 7/2001 | Antonelli et al. | |
| 6,272,562 B1 | 8/2001 | Scott et al. | |
| 6,281,931 B1 | 8/2001 | Tsao et al. | |
| 6,327,047 B1 | 12/2001 | Motamed | |
| 6,347,163 B2 | 2/2002 | Roustaei | |
| 6,809,303 B2 * | 10/2004 | Carver et al. | 219/543 |
| 2003/0089702 A1 | 5/2003 | Carver et al. | |

FOREIGN PATENT DOCUMENTS

| | | |
|---|---|---|
| EP | 0 308 162 A2 | 3/1989 |
| EP | 0 308 162 A3 | 3/1989 |
| EP | 0 379 333 A1 | 7/1990 |
| EP | 0 623 890 A2 | 11/1994 |
| EP | 0 623 890 A3 | 11/1994 |
| EP | 0 653 882 A1 | 5/1995 |
| EP | 0 379 333 B1 | 7/1995 |
| EP | 0 889 432 A2 | 1/1999 |
| EP | 0 889 432 A3 | 1/1999 |
| EP | 0 905 646 A1 | 3/1999 |
| EP | 0 785 750 B1 | 6/1999 |
| EP | 0 924 656 A2 | 6/1999 |
| EP | 0 623 890 B1 | 8/2001 |
| GB | 2 089 545 A | 6/1982 |
| GB | 2 313 441 A | 11/1997 |
| JP | 59-142176 * | 8/1984 |
| JP | 62-212892 A | 9/1987 |
| JP | 1-205392 A | 8/1989 |
| JP | 3-161884 A | 7/1991 |
| JP | 3-194674 A | 8/1991 |
| JP | 3-194675 A | 8/1991 |
| JP | 11-225272 A | 8/1999 |
| JP | 11-289421 A | 10/1999 |
| WO | WO 87/02491 A1 | 4/1987 |
| WO | WO 90/03620 A1 | 4/1990 |
| WO | WO 92/11608 A1 | 7/1992 |
| WO | WO 94/22371 A2 | 10/1994 |
| WO | WO 94/22371 A3 | 10/1994 |
| WO | WO 96/17480 A2 | 6/1996 |
| WO | WO 96/17480 A3 | 6/1996 |
| WO | WO 97/29477 A1 | 8/1997 |
| WO | WO 97/41528 A1 | 11/1997 |
| WO | WO 98/09246 A1 | 3/1998 |
| WO | WO 98/12670 A1 | 3/1998 |
| WO | WO 99/12123 A1 | 3/1999 |
| WO | WO 99/26187 A1 | 5/1999 |
| WO | WO 99/40535 A1 | 8/1999 |
| WO | WO 02/088878 A2 * | 11/2002 |
| WO | WO 02/088878 A3 * | 11/2002 |

OTHER PUBLICATIONS

Drake, M.D. et al., "*Waveguide Hologram Fingerprint Entry Device,*" Optical Engineering, vol. 35, No. 9, Sep. 1996, pp. 2499-2505.

Venot, A. et al., "*Automated Comparison of Scintigraphic Images,*" Journal of Nuclear Medicine, vol. 27, No. 8, Aug. 1986, pp. 1337-1342.

Automated Identification Systems (visited May 20, 1999) <http://www.trw.com/idsystems/bldgaccess2.html>, 1 page, Copyright 1999.

Ultra-Scan Corporation Home Page (visited May 20, 1999) <http://www.ultra-scan.com/index.htm>, 3 pages. (discusses technology as early as 1996).

Profile (last updated Aug. 16, 1998) <http://www.dermalog.de/Britain/Profile/profile.htm>, 3 pages. (discusses technology as early as 1990).

ID-Card System Technical Specifications (last updated Jul. 18, 1998) <http://dermalog.de/Britain/Products/ID-Card/idcard2.htm>, 2 pages.

Fujitsu Limited Products and Services (updated Apr. 21, 1999) <http://www.fujitsu.co.jp/hypertext/Products/index-e.html>, 3 pages, Copyright 1995-1999.

SonyDCam (visited May 20, 1999) <http://www.microsoft.com/DDK/ddkdocs/Win2k/sonydcam.htm>, 3 pages, Copyright 1999.

Verid Fingerprint Verification (visited May 17, 1999) <http://www.tssi.co.uk/products/finger.html>, 2 pages.

Startek's Fingerprint Verification Products: Fingerguard FG-40 (visited May 18, 1999) <http://www.startek.com.tw/product/fg40/fg40.html>, 3 pages.

SAC Technologies Showcases Stand-Alone SAC-Remote(TM) (visited May 18, 1999) <http://www.pathfinder.com/money/latest/press/PW/1998Mar25/1026.html>, 2 pages.

"*Biometrics, The Future Is Now,*" www.securitymagazine.com, May 1999, pp. 25-26.

Mytec Technologies Gateway, (visited Apr. 27, 1999) <http://www.mytec.com/Products/gateway/>, 1 page.

Mytec Technologies Gateway: Features & Benefits, (visited Apr. 27, 1999) <http://www.mytec.com/Products/gateway/features.htm>, 1 page.

Mytec Technologies Touchstone Pro, (visited Apr. 27, 1999) <http://www.mytec.com/Products/Touchstone/>, 1 page.

Mytec Technologies Touchstone Pro: Features, (visited Apr. 27, 1999) <http://www.mytec.com/Products/Touchstone/features.htm>, 1 page.

Electronic Timeclock Systems and Biometric Readers (last updated Apr. 17, 1999) <http://www.lfs-hr-bene.com/tclocks.html>, 1 page.

Fingerprint Time Clock (visited May 17, 1999) <http://www.lfs-hr-bene.com/Biometrics/Fingerprintclock.html>, 6 pages.

KC-901: The KSI fingerprint sensor (visited May 17, 1999) <http://www.kinetic.bc.ca/kc-901.html>, 3 pages.

Intelnet Inc. (visited May 20, 1999) <http://www.intelgate.com/index.html>, 1 page, Copyright 1996.

Ver-i-Fus Fingerprint Access Control Systems (visited May 20, 1999) <http://www.intelgate.com/verifus.htm>, 2 pages. (Ver-i-fus product released in 1995).

Ver-i-fus® Configurations (visited May 20, 1999) <http://www.intelgate.com/verconfig.htm>, 1 page. (Ver-i-fus product released in 1995).

Ver-i-Fus® & Ver-i-Fusmil® (visited May 20, 1999) <http://www.intelgate.com/vif_data.htm>, 3 pages. (Ver-i-fus product released in 1995).

Access Control System Configurations (visited May 20, 1999) <http://www.intelgate.com/access.htm>, 2 pages. (Ver-i-fus product released in 1995).

Company (visited May 17, 1999) <http://www.instainfo.com.company.htm>, 2 pages.

TouchLock™ II Fingerprint Identity Verification Terminal (visited May 17, 1999) <http://www.identix.com/TLock.htm>, 4 pages.

Physical Security and Staff Tracking Solutions (visited May 17, 1999) <http://www.identix.com/products/biosecurity.html>, 3 pages, Copyright 1996-1998.

Veriprint2000 Fingerprint Verification Terminal For Use With Jantek Time & Attendance Software (visited May 17, 1999) <http://www.hunterequipment.com/fingerprint.htm>, 2 pages.

Veriprint Product Applications (visited Apr. 27, 1999) <http://www.biometricid.com/uses.htm>, 1 page, Copyright 1999.

BII Home Page (visited Apr. 27, 1999) <http://www.biometricid.com/homepage.htm>, 1 page, Copyright 1999.
Veriprint 2100 Stand-Alone Fingerprint Verification Terminal (visited Apr. 27, 1999) <http://www.biometricid.com/veriprint2100.htm>, 3 pages.
Randall, N., "A Serial Bus on Speed," PC Magazine, May 25, 1999, pp. 201-203.
The DERMALOG Check-ID (visited Nov. 12, 1999) <http://www.dermalog.de/ganzneu/products_check.html>, 1 page.
Check-ID Specifications and Features (visited Nov. 12, 1999) <http://www.dermalog.de/ganzneu/spec_check.html>, 1 page, Copyright 1999.
Startek's Fingerprint Verification Products: FingerFile 1050 (visited Oct. 8, 1999) <http://www.startek.com.tw/product/ff1050/ff1050.html>, 3 pages.
Time is Money! (visited Jun. 5, 1998) <http://www.iaus.com/afim.htm>, 3 pages.
LS 1 LiveScan Booking Workstation High Performance Finger & Palm Scanning System (visited Jun. 4, 1998) <http://www.hbs-jena.com/Is1.htm>, 6 pages, Copyright 1998.
Welcome to the Homepage of Heimann Biometric Systems GMBH (visited Jun. 4, 1998) <http://www.hbs-jena.com/>, 1 page, Copyright 1998.
Heimann Biometric Systems Corporate Overview (visited Jun. 4, 1998) <http://www.hbs-jena.com/company.htm>, 4 pages, Copyright 1998.
Remote Access Positive IDentification—raPID (visited Jun. 3, 1998) <http://www.nec.com/cgi-bin/showproduct.exe?pro...emote+Access+Positive+IDentification+%2D+raPID>, 2 pages, Copyright 1997.
Morpho DigiScan Cellular (visited Jun. 3, 1998) <http://www.morpho.com/products/law_enforcement/digiscan/cellular.htm>, 2 pages, Copyright 1998.
A.F.I.S. (last updated Apr. 2, 1998) <http://www.dermalog.de/afis.htm>, 2 pages.
Morpho FlexScan Workstation (visited Jun. 3, 1998) <http://www.morpho.com/products/law_enforcement/flexscan/>, 2 pages, Copyright 1998.
Printrak International: User List (visited Jun. 3, 1998) <http://www.printrakinternational.com and links>, 10 pages, Copyright 1996.
Live-Scan Products: Tenprinter® 1133S (visited Apr. 23, 1999) <http://www.digitalbiometrics.com/Products/tenprinter.htm>, 4 pages. (Tenprinter 1133S released in 1996).
TouchPrint™ 600 Live-Scan System (visited Nov. 17, 1999) <http://www.identix.com/products/livescan.htm>, 4 pages, Copyright 1996-1998.
Systems for Live-Scan Fingerprinting, Digital Biometrics, Inc., 8 pages, Copyright 1998.
DBI FingerPrinter CMS, Digital Biometrics, Inc., 5 pages. (CMS released in 1998).
Fingerscan V20, Identix Incorporated, 1 page, Copyright 1999.
Response to Request for Information, Cross Match Technologies, Inc., 13 pages, Apr. 14, 1999.
Startek's Fingerprint Verification Products (visited Nov. 17, 1999) <http://www.startek.com.tw/product/index.html>, 1 page.
Introduction to Startek's Fingerprint Verification Products (visited Nov. 17, 1999) <http://www.startek.com.tw/product/index2.html>, 2 pages.
Automatic Fingerprint Identification Systems (visited Nov. 17, 1999) <http://www.sagem.com/en/produit4-en/empreinte-dig-en.htm>, 1 page.
Digital Biometrics Corporate Information (visited Nov. 17, 1999) <http://www.digitalbiometrics.com/Corporate_info/Corporate_info.htm>, 2 pages. (discusses technology as early as 1985).
DBI Live-Scan Products: Digital Biometrics TENPRINTER (visited Nov. 17, 1999) <http://www.digitalbiometrics.com/products/tenprinter.htm>, 4 pages. (Tenprinter released in 1996).
DBI Live-Scan Products: Networking Options (visited Nov. 17, 1999) <http://www.digitalbiometrics.com/products/networking_options.htm>, 3 pages.
DBI Live-Scan Products: Digital Biometrics FingerPrinter CMS (visited Nov. 17, 1999) <http://www.digitalbiometrics.com/products/FingerPrinterCMS.htm>, 3 pages. (CMS released in 1998).
DBI Live-Scan Products: Image Printer Stations (visited Nov. 17, 1999) <http://www.digitalbiometrics.com/products/imageprinter.htm>, 2 pages.
DBI Live-Scan Products: FC-21 Fingerprint Capture Station (visited Nov. 17, 1999) <http://www.digitalbiometrics.com/products/Fingerprintcapture.htm>, 2 pages.
Series 400 OEM Scanner (visited Nov. 17, 1999) <http://www.ultra-scan.com/400.htm>, 3 pages. (Scanner released in 1996).
USC Scanner Design (visited Nov. 17, 1999) <http://www.ultra-scan.com/scanner.htm>, 4 pages. (Scanner released in 1996).
Series 500/600 Scanners (visited Nov. 17, 1999) <http://www.ultra-scan.com/500.htm>, 3 pages. (Scanner released in 1996).
Series 700 ID Station (visited Nov. 17, 1999) <http://www.ultra-scan.com/700.htm>, 3 pages. (Scanner released in 1998).
Identix: The Corporation (visited Nov. 17, 1999) <http://www.identix.com/corporate/home.htm>, 2 pages, Copyright 1996-1998.
Biometric Imaging Products (visited Nov. 17, 1999) <http://www.identix.com/products/bioimage.htm>, 1 page, Copyright 1996-1998.
TouchPrint™ 600 Live-Scan System (visited Apr. 23, 1999) <http://www.identix.com/products/livescan.htm>, 4 pages, Copyright 1996-1998.
TouchPrint™ 600 Palm Scanner (visited Nov. 17, 1999) <http://www.identix.com/products/palmscan.htm>, 3 pages, Copyright 1996-1998.
TouchPrint™ 600 Card Scan System (visited Nov. 17, 1999) <http://www.identix.com/products/cardscan.htm>, 3 pages, Copyright 1996-1998.
Dermalog Key—The safest and easiest way of access control (Last updated Jul. 18, 1998) <http://www.dermalog.de/Britain/Products/Key/key.htm>, 1 page.
Dermalog Finger-ID Your small size solution for high security (Last updated Jul. 18, 1998) <http://www.dermalog.de/Britain/Products/Finger/fingerid.htm>, 1 page.
Mytec: Corporate (visited Nov. 17, 1999) <http://www.mytec.com/corporate/>, 2 pages.
Kinetic Sciences Inc. Fingerprint Biometrics Division (visited Nov. 17, 1999) <http://www.kinetic.bc.ca/main-FPB.html>, 1 page.
Fingerprint Biometrics: Securing The Next Generation, May 19, 1999, (visited Nov. 17, 1999) <http://www.secugen.com/pressrel.htm>, 2 pages.
Secugen Unveils Fully Functional Fingerprint Recognition Solutions, May 11, 1999, (visited Nov. 17, 1999) <http://www.secugen.com/pressrel.htm>, 3 pages.
POLLEX Technology Ltd., The Expert in Fingerprint Identification—POLLog (visited Nov. 17, 1999) <http://www.pollex.ch/english/products/pollog.htm>, 2 pages.
Sony Fingerprint Identification Terminal (visited Nov. 17, 1999) <http://www.iosoftware.com/biosols/sony/fiu/applications/fit100.htm>, 2 pages.
Sony Fingerprint Identification Unit (FIU-700) (visited Nov. 17, 1999) <http://www.iosoftware.com/biosols/sony/fiu70/index.htm>, 2 pages. (Unit available late 1999).
Sony Fingerprint Identification Unit (visited Nov. 17, 1999) <http://www.iosoftware.com/biosols/sony/fiu/index.htm>, 3 pages.
Fujitsu Fingerprint Recognition Device (FPI-550) (visited Nov. 17, 1999) <http://www.iosoftware.com/biosols/fujitsu/fpi550.htm>, 2 pages.
Mitsubishi MyPass LP-1002 (visited Nov. 17, 1999) <http://www.iosoftware.com/biosols/mitsubishi/mypass.htm>, 2 pages.
SecureTouch PV—A Personal "Password Vault" (visited Nov. 17, 1999) <http://www.biometricaccess.com/securetouch_pv.htm>, 1 page.
Digital Descriptor Systems, Inc.-Profile (visited Nov. 17, 1999) <http://www.ddsi-cpc.com/pages/profile.html>, 3 pages.
Press Release: Printrak International Announces New Portable Fingerprint ID Solution, Dec. 10, 1996, (visited Nov. 17, 1999) <http://www.scott.net/~dg/25.htm>, 3 pages.
Corporate Profile (visited Nov. 17, 1999) <http://www.printrakinternational.com/corporate.htm>, 1 page.

Printrak Products (visited Nov. 17, 1999) <http://www.printrakinternational.com/Products.htm>, 1 page. (Discusses technology as early as 1974).

Verifier™ 200 Fingerprint Capture Devices, Cross Match Technologies, Inc., 2 pages, 1996-1997.

Verifier 200 Direct Fingerprint Reader, Cross Check Corporation, 2 pages, 1996-1997.

Verifier™ 250 Fingerprint Capture Devices, Cross Match Technologies, Inc., 2 pages, 1996-1997.

Verifier 250 Small Footprint Direct Fingerprint Reader, Cross Check Corporation, 2 pages, 1996-1997.

Verifier™ 290 Fingerprint Capture Devices, Cross Match Technologies, Inc., 2 pages, 1996-1997.

Verifier 290 Direct Rolled Fingerprint Reader, Cross Check Corporation, 2 pages, 1996-1997.

Verifier™ 500 Fingerprint Capture Devices, Cross Match Technologies, Inc., 2 pages, 1998.

10-Print Imaging System, Cross Check Corporation, 2 pages, 1998.

Cross Match Technologies, Inc. (visited Mar. 25, 1999) <http://www.crossmatch.net/>, 1 page.

Cross Match Technologies, Inc.—Products Overview (visited Mar. 25, 1999) <http://www.crossmatch.net/new/products/product-index.html>, 1 page.

Cross Match Technologies, Inc.—Law Enforcement Systems (visited Mar. 25, 1999) <http://www.crossmatch.net/new/law/law-index.html>, 2 pages.

Cross Match Technologies, Inc.—Commercial Systems: Building On The Standard (visited Mar. 25, 1999) <http://www.crossmatch.net/new/commercial/commercial-index.html>, 2 pages.

Cross Match Technologies, Inc.—International Sales (visited Mar. 25, 1999) <http://www.crossmatch.net/new/sales/sales-index.html>, 1 page.

Cross Match Technologies, Inc.—Support (visited Mar. 25, 1999) <http://www.crossmatch.net/new/support/support-index.html>, 1 page.

Cross Match Technologies, Inc.—News—Press Releases—Verifier 400 Press Release (visited Mar. 25, 1999) <http://www.crossmatch.net/news/news-pr-050798.html>, 1 page.

Global Security Fingerscan™ System Overview (visited Jan. 11, 2000) <http://wwwu-net.com/mbp/sol/g/a9.htm>, 12 pages.

"Command Structure for a Low-Cost (Primitive) Film Scanner," IBM Technical Disclosure Bulletin, IBM Corp., vol. 35, No. 7, Dec. 1992, pp. 113-121.

Fingerprint Scan API Toolkit Version 1.x Feature List (Apr. 26, 2000) <http://www.mentalix.com/api/archive_fapivl.htm>, 3 pages.

"*Image Acquisition System*," IBM Technical Disclosure Bulletin, IBM Corp., vol. 29, No. 5, Oct. 1986, pp. 1928-1931.

Kunzman, Adam J. and Wetzel, Alan T., "*1394 High Performance Serial Bus: The Digital Interface for ATV*," IEEE Transaction on Consumer Electronics, IEEE, vol. 41, No. 3, Aug. 1995, pp. 893-900.

Mentalix Provides The First IAFIS-Certified Latent Print Scanning Solution For Windows® (Jul. 23, 1999) <http://www.mentalix.com/pressreleases/fprintplook3_prel.htm>, 2 pages.

Sluijs, F. et al., "*An On-chip USB-powered Three-Phase Up/down DC/DC Converter in a Standard 3.3V CMOS Process*," 2000 IEEE International Solid-State Circuits Conference, IEEE, Feb. 9, 2000, pp. 440-441.

English-language Abstract for Japanese Patent Publication No. 59-103474, published Jun. 14, 1984, printed from espacenet.com, 1 page.

English-language Abstract for Japanese Patent Publication No. 62-212892, published Sep. 18, 1987, printed from espacenet.com, 1 page.

English-language Abstract for Japanese Patent Publication No. 1-205392, published Aug. 17, 1989, printed from espacenet.com, 1 page.

English-language Abstract for Japanese Patent Publication No. 3-161884, published Jul. 11, 1991, printed from espacenet.com, 1 page.

English-language Abstract for Japanese Patent Publication No. 3-194674, published Aug. 26, 1991, printed from espacenet.com, 1 page.

English-language Abstract for Japanese Patent Publication No. 3-194675, published Aug. 26, 1991, printed from espacenet.com, 1 page.

English-language Abstract for Japanese Patent Publication No. 10-079017, published Mar. 24, 1998, printed from espacenet.com, 1 page.

English-language Abstract for Japanese Patent Publication No. 10-262071, published Sep. 29, 1998, printed from espacenet.com, 1 page.

English-language Abstract for Japanese Patent Publication No. 11-167630, published Jun. 22, 1999, printed from espacenet.com, 1 page.

English-language Abstract for Japanese Patent Publication No. 11-225272, published Aug. 17, 1999, printed from espacenet.com, 1 page.

English-language Abstract for Japanese Patent Publication No. 11-252489, published Sep. 17, 1999, printed from espacenet.com, 1 page.

English-language Abstract for Japanese Patent Publication No. 11-289421, published Oct. 19, 1999, printed from espacenet.com, 1 page.

* cited by examiner

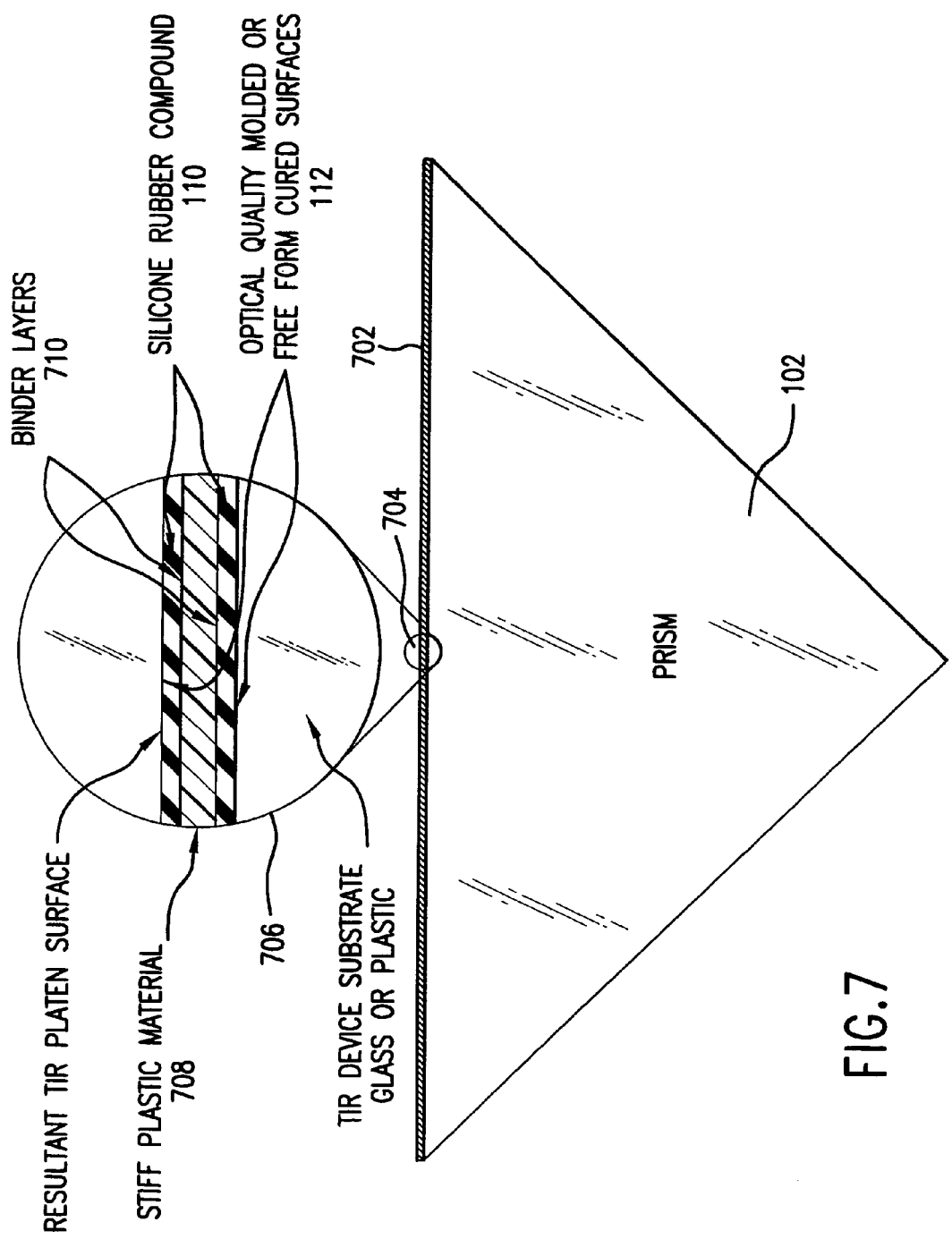

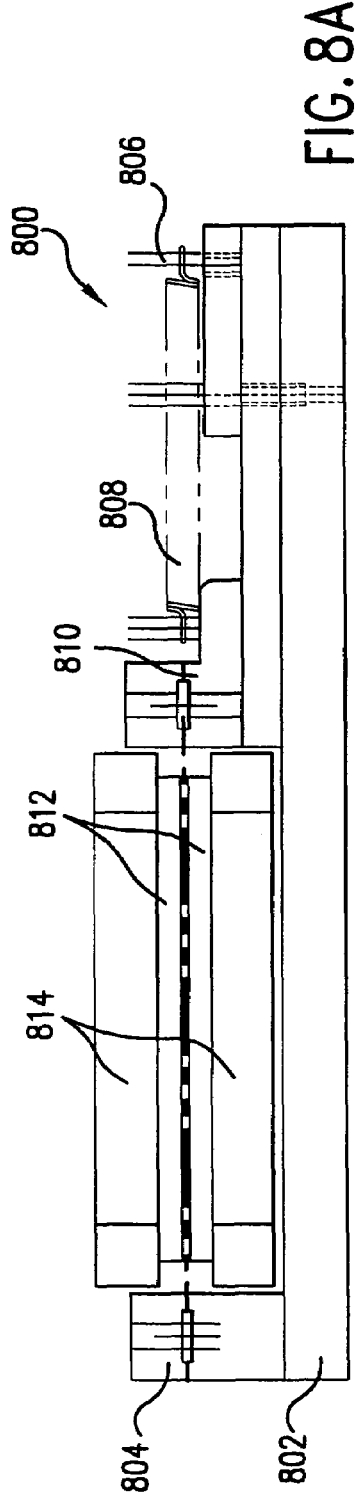
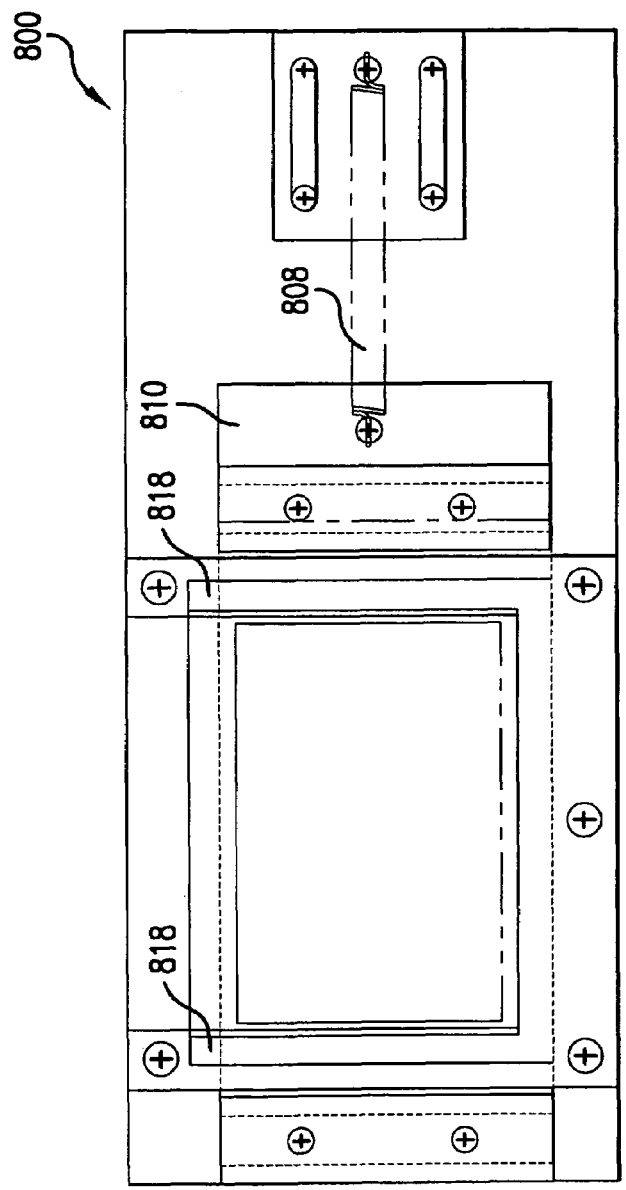

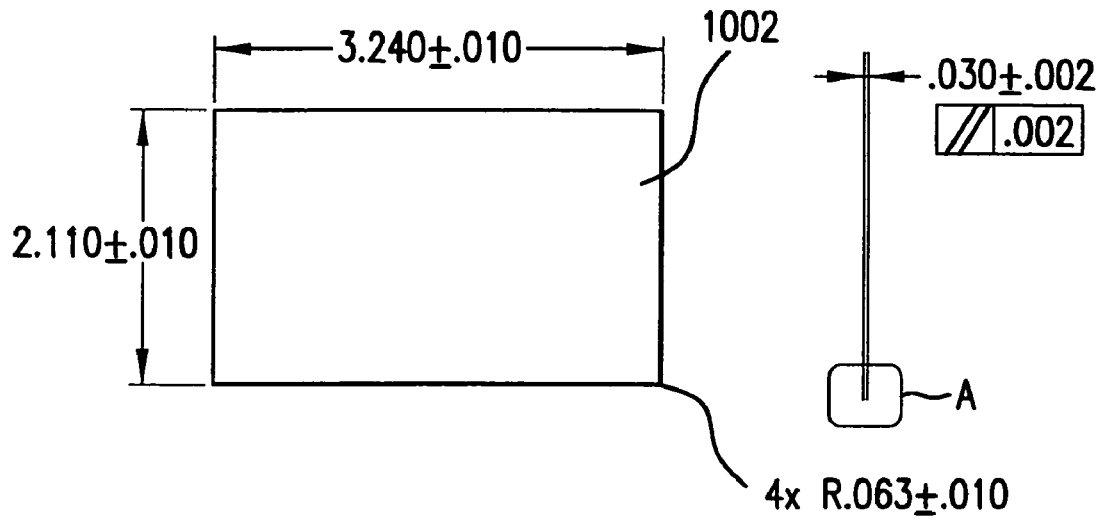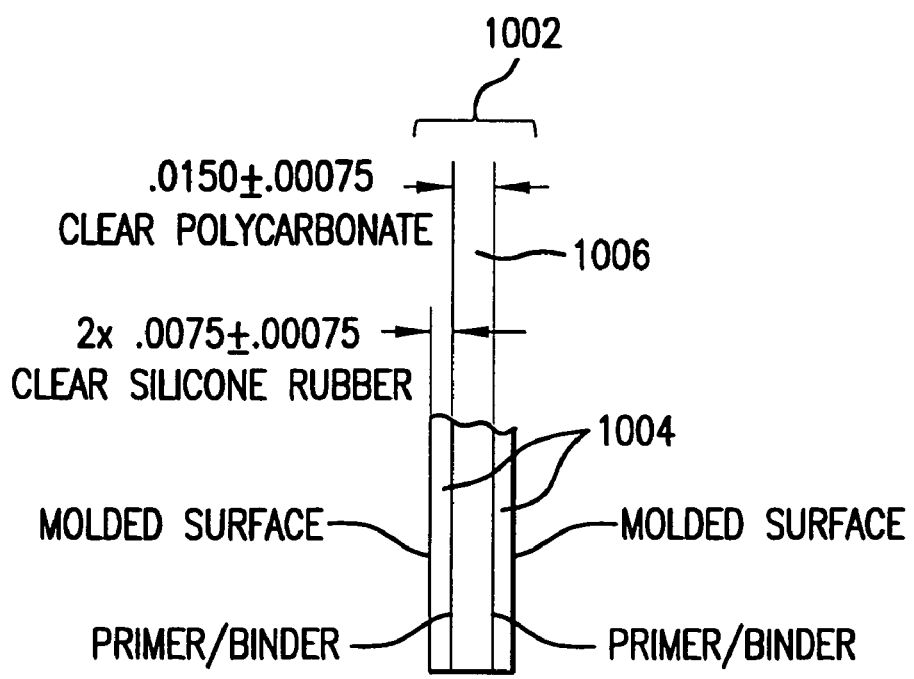
FIG. 10A

SILICONE RUBBER SURFACES FOR BIOMETRIC PRINT TIR PRISMS

This application is a divisional of U.S. patent application Ser. No. 10/132,719, filed Apr. 26, 2002, now abandoned which claims the benefit under 35 U.S.C. §119(e) of U.S. Provisional Application No. 60/286,373, filed Apr. 26, 2001, and U.S. Provisional Application No. 60/292,341, filed May 22, 2001, which are incorporated by reference herein in their entireties.

BACKGROUND OF THE INVENTION

1. Field of the Invention

The present invention relates generally to the field of biometrics.

2. Background Art

Biometrics is a science involving the analysis of biological characteristics. Biometric imaging captures a measurable characteristic of a human being for identity purposes. See, e.g., Gary Roethenbaugh, *Biometrics Explained*, International Computer Security Association, Inc. (1998), pp. 1-34, which is incorporated herein by reference in its entirety.

Fingerprint scanners and palm scanners are two types of biometric imaging systems for acquiring fingerprint images and palm print images, respectively. Many fingerprint and palm print scanners include glass platens that result in latent prints. Latent print images are images of prints that remain on the platen after a person's finger or palm have been removed and may show up on subsequent images of fingerprints or palm prints acquired thereafter. To eliminate latent print images, glass platens have been replaced by platens made of silicone rubber sheets.

Commercially available silicone rubber sheets are often manufactured using a process known as calendaring. Calendaring is a rolling process in which a machine with rollers, known as a calendar, is used to form thin sheets from plastic, paper, or other materials. For silicone rubber sheets, liquid silicone is poured on rollers of the calendar with a catalyst and mixed. The rollers rotate several times. As the temperature is changed from cold to hot, the mixture begins to form a rubber sheet. The rubber sheet is then passed through another set of rollers that are very hot. The rubber sheet is then released and hardens almost instantly.

Silicone rubber sheets manufactured using calendaring often have problems associated with them. For example, they may not be completely flat, and often have inclusions and striations that cannot be removed. The silicone rubber sheets may also be cloudy in color. For many applications these characteristics may not be a problem. But in applications where the silicone rubber sheets need to be of optical quality, such as biometric imaging, commercially available silicone rubber sheets produced from calendaring do not provide adequate surface quality or finish to optimize image enhancement.

Silicone rubber molding is another process used to produce many products. However, conventional methods for molding silicone rubber also do not provide the optical quality needed for biometric imaging.

What is needed is an optical quality silicone rubber sheet that provides adequate surface quality or finish to optimize image enhancement. What is further needed is a method for making the same.

BRIEF SUMMARY OF THE INVENTION

The present invention solves the above-mentioned needs by providing silicone rubber sheets with optical quality surfaces and methods for making the same. The silicone rubber sheets are made by molding liquid silicone rubber in a mold. In embodiments, the mold forms parallel optical quality flat surfaces. In one embodiment, a stiffening plastic is molded in the middle of the silicone rubber between the parallel optical quality flat surfaces. In another embodiment, the mold forms one optical quality flat surface while the surface parallel to the optical quality flat surface is bonded to a prism during the molding process.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

FIG. 7 is a diagram illustrating an optical quality reinforced silicone rubber sheet according to an embodiment of the invention.

FIG. 8A is a side view of a mold for making an optical quality reinforced silicone rubber sheet according to an embodiment of the invention.

FIG. 8B is a top view of a mold for making an optical quality reinforced silicone rubber sheet according to an embodiment of the invention.

FIG. 10A is an exemplary diagram illustrating an optical quality reinforced silicone rubber sheet for a fingerprint scanner.

Figure 1:
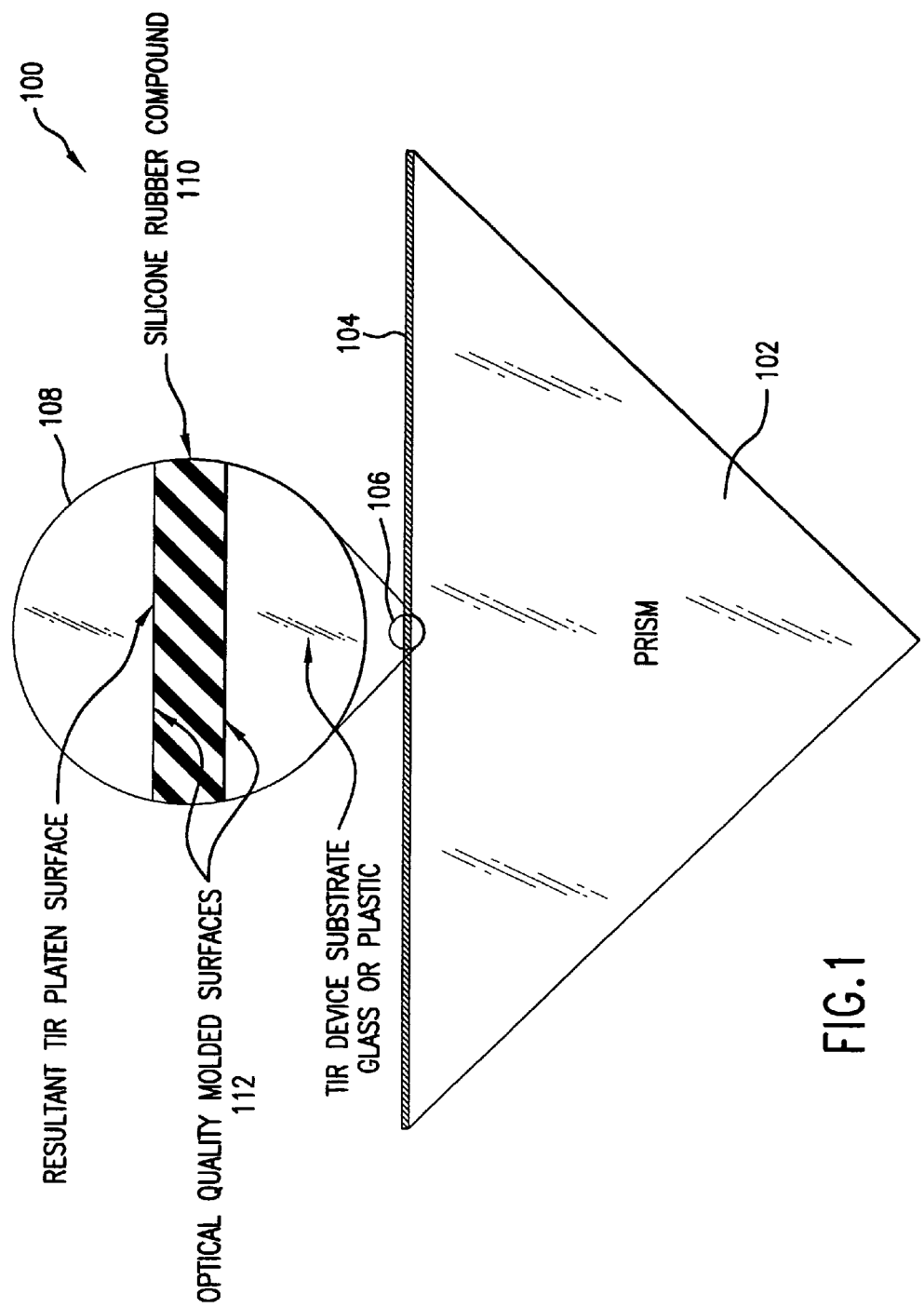
FIG. 1 is a diagram illustrating an optical quality silicone rubber sheet for a biometric TIR prism.

The features, objects, and advantages of the present invention will become more apparent from the detailed description set forth below when taken in conjunction with the drawings in which like reference characters identify corresponding elements throughout. In the drawings, like reference numbers generally indicate identical, functionally

DETAILED DESCRIPTION OF THE INVENTION

The present invention provides optical quality silicone rubber sheets and methods for making the same. The optical quality silicone rubber sheets are produced using molding methods that provide adequate surface quality or finish to optimize image enhancement for many applications, such as biometric imaging.

Silicone Rubber Sheet

FIG. 1 is a diagram 100 illustrating an optical quality silicone rubber sheet for a biometric TIR prism. FIG. 1 shows a prism 102 and an optical quality silicone rubber sheet 104 attached to prism 102. An enlarged view 108 of a portion 106 of silicone rubber sheet 104 is also shown in FIG. 1. Enlarged view 108 shows the components of silicone rubber sheet 104. The components of silicone rubber sheet 104 include a silicone rubber compound 110 and two parallel optical quality molded surfaces 112.

In one embodiment, silicone rubber compound 110 is comprised of liquid silicone. In another embodiment, silicone rubber compound 110 is comprised of liquid silicone diluted with a thinning solution. The dilution may range from 10 to 40 percent.

At least one of the optical quality molded surfaces 112 enables optical contact with prism 102. In other words, when silicone rubber sheet 104 is applied to the surface of prism 102, silicone rubber sheet 104 adheres to prism 102 without any separation between prism 102 and silicone rubber sheet 104. Quality molded surfaces 112 have a surface flatness of 4 to 6 waves of light per inch. In an embodiment, one of the quality molded surfaces 112 is used to make optical contact with prism 102. The other quality molded surface is used as a TIR (Total Internal Reflection) platen surface.

The thickness of silicone rubber sheet 104 may range from 30 to 60 mils. The thickness of silicone rubber sheet 104 is dependent on the application in which it is used. For example, in the application of biometric imaging, the thickness of silicone rubber sheet 104 is dependent upon the size of prism 104. The smaller the prism, the smaller the thickness of silicone rubber sheet 104. The larger the prism, the larger the thickness of silicone rubber sheet 104. For example, a fingerprint scanner may use a smaller prism than a palm print scanner. The fingerprint scanner with the smaller prism may therefore require silicone rubber sheeting that is closer to the lower range of thickness, that is 30 mils, while the palm print scanner with the larger prism may require silicone rubber sheeting that is closer to the higher range of thickness, that is 60 mils.

In an embodiment, RTV (Room Temperature Vulcanization) liquid silicone manufactured by General Electric is used. RTV is a very clear liquid silicone. RTV is comprised of two parts that when mixed together cause it to vulcanize at room temperature. As its name implies, RTV may be cured at room temperature. RTV is not limited to curing at room temperature. RTV may also be cured by heating to accelerate the curing process.

Figure 2:
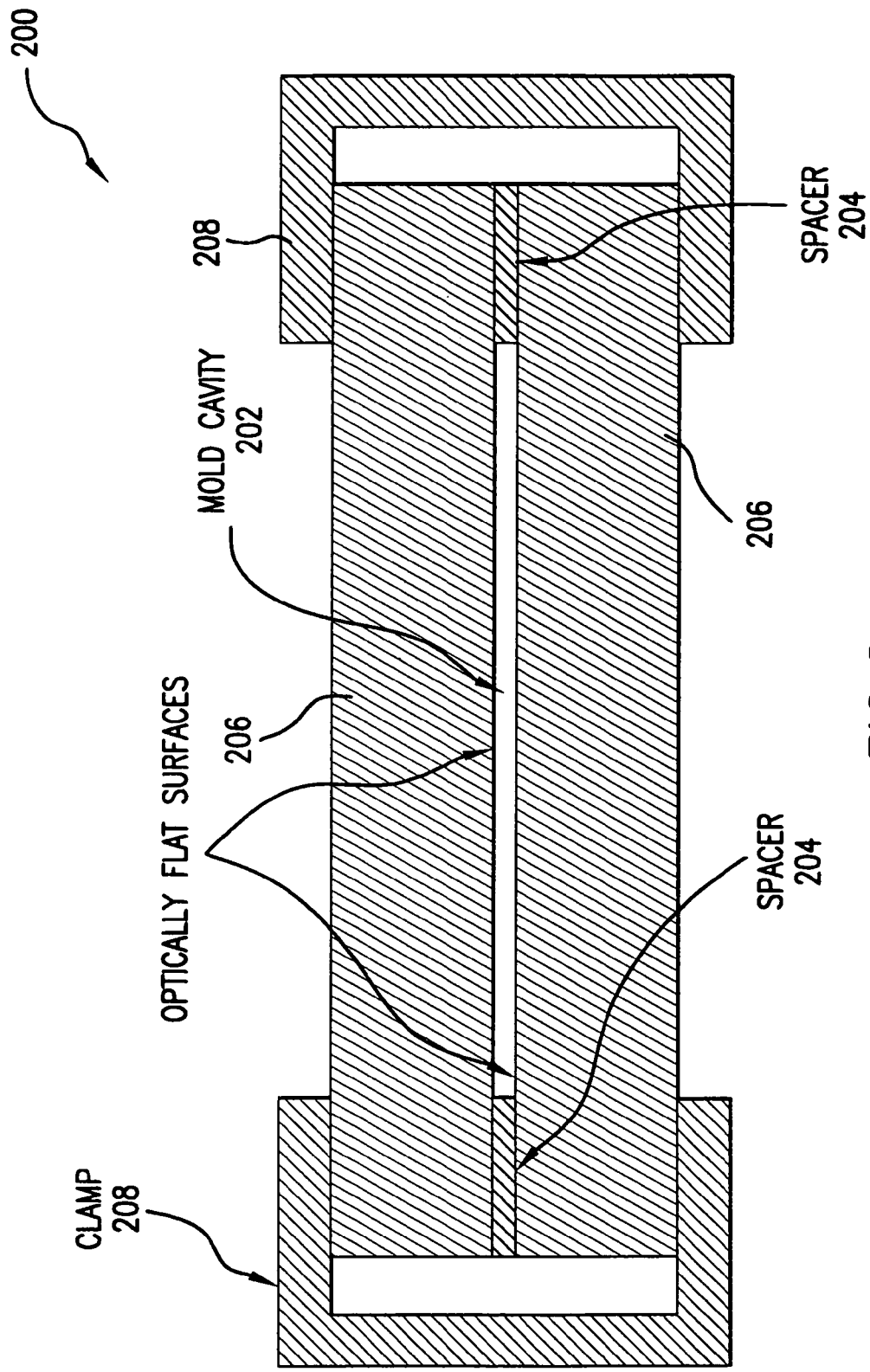
FIG. 2 is a mold for making an optical quality silicone rubber sheet according to an embodiment of the invention.

FIG. 2 is an exemplary mold 200 for making optical quality silicone rubber sheet 104. Mold 200 is comprised of a mold cavity 202, a plurality of spacers 204, two plates 206, and two clamps 208. Spacers 204 are located at three edges of mold cavity 202. The two plates 206 may be a glass or plastic plate for visibility. In one embodiment, the two plates 206 are two pieces of float glass. Float glass provides optically flat surfaces. In other words, the surface flatness of float glass is within 4 to 6 wavelengths of light per inch. In an embodiment, each float glass plate 206 may be ¾ inch thick. The present invention is not limited to using float glass. Other types of plates 206, such as plastics or optically polished materials, may be used that allow for visibility, provide for optically flat surfaces, and do not stick to rubber. For example, such plastics as acrylic, polycarbonate, polypropolene, polyethylene, teflon, etc. may be used if they meet the optically flat standard of at least 4 to 6 wavelengths of light per inch.

Once the molding process for a given configuration is developed, the molds may be made of opaque materials that are compatible with silicone rubber.

The two plates 206 are separated by spaces 204. The thickness of spacers 204 are equivalent to the desired thickness of the silicone rubber sheet to be molded. Clamps 208 are U-shaped and adjustable, and are used to hold the two pieces of float glass 206 together. Clamps 208 are applied with enough force to prevent leakage of silicone rubber compound 110. Mold cavity 202 is used to hold the liquid silicone compound for making silicone rubber sheet 104.

Figure 3:
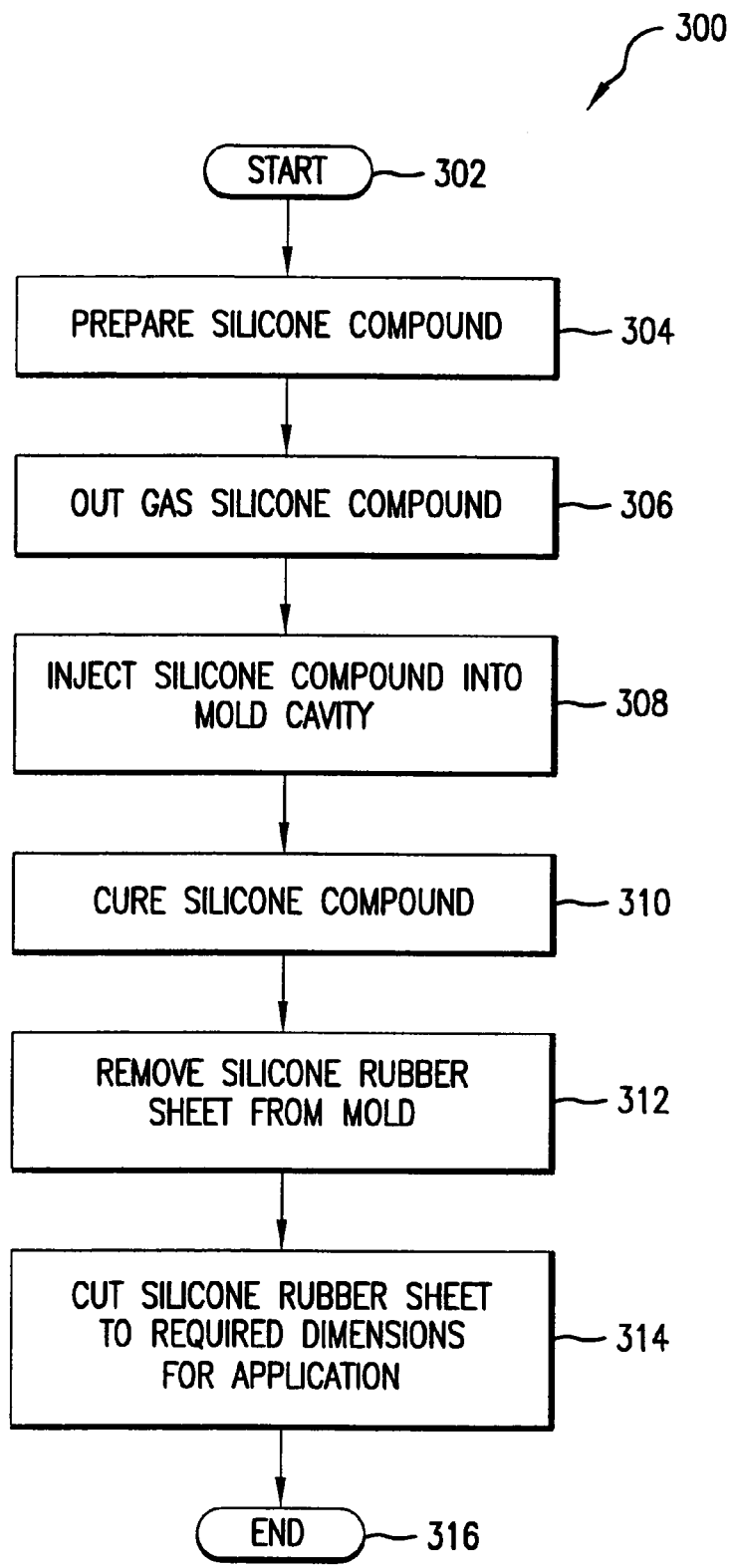
FIG. 3 is a method for making an optical quality silicone rubber sheet according to an embodiment of the invention.

FIG. 3 is a method 300 for making optical quality silicone rubber sheet 104 according to an embodiment of the invention. The process begins with step 302, where the process immediately proceeds to step 304.

In step 304, silicone rubber compound 110 is prepared. As previously stated, silicone or RTV is in two parts and the two parts must be mixed together. In one embodiment, silicone rubber compound 110 is comprised of 100 percent RTV. In another embodiment, RTV is diluted between 10 to 40 percent with Toluene to produce silicone rubber compound 110. Toluene is a solvent to silicone rubber and may be purchased at any hardware store. General Electric recommends that Toluene be used to thin RTV, if desired. The process then proceeds to step 306.

In step 306, silicone rubber compound 110 is out gassed. Silicone rubber compound 110 is placed in a vacuum chamber to get all of the entrapped air out of silicone rubber compound 110.

In step 308, silicone rubber compound 110 is injected into mold cavity 202. The process then proceeds to step 310.

In step 310, silicone rubber compound 110 is cured in mold cavity 202. Mold 200 is placed into a temperature controlled oven. Silicone rubber compound 110 is cured for a certain amount of time at a specific temperature. Table 1 shows the recommended temperature vs. cure time for curing silicone rubber compound 110. The temperatures and cure times are recommended by General Electric, the manufacturer of a specific variety of RTV.

TABLE 1

| Temperature° C. (° F.) | Cure Times |
| --- | --- |
| 25 (77) | 6 to 7 days |
| 65 (149) | 4 hours |
| 100 (212) | 1 hour |
| 125 (257) | 45 minutes |
| 150 (302) | 15 minutes |

In one embodiment, silicone rubber compound 110 is cured for 1 hour at temperature 100° C. (212° F.). Other cure times and temperatures shown in Table 1 may be used without departing from the scope of the invention. At the end of the desired cured time, mold 200 is removed from the temperature controlled oven. Curing silicone rubber compound 110 causes the float glass surface of plates 206 to be replicated on the surface of silicone rubber compound 110 that forms a TIR surface for the resulting silicone rubber sheet 104. The process proceeds to step 312.

In step 312, the mold is taken apart in order to remove silicone rubber sheet 104. Clamps 208 are removed and plates 206 are separated. Silicone rubber sheet 104 is peeled from one of plates 206. The plate 206 in which silicone rubber sheet 104 is peeled from depends on which one of the two plates are easily separated from silicone rubber sheet 104. The plate 206 that is hardest to remove requires that silicone rubber sheet 104 be peeled off. The process then proceeds to step 314.

In step 314, silicone rubber sheet 104 is cut to the desired dimensions for its particular application. Silicone rubber sheet 104 may be cut with a die cutter. Other cutting devices may also be used, such as an exacto knife, shears, etc. The process then proceeds to step 316, where the process ends.

Integrally Molded Silicone Rubber Surface

Silicone rubber sheets 104 produced using molding process 300 provide optical clarity and flatness without striations (induced stress in the silicone) and inclusions that result from commercial silicone rubber sheets that are produced using the calendaring process. Although silicone rubber sheet 104 produced using molding process 300 provides a precise optical quality silicone rubber layer, silicone rubber sheet 104 may be difficult to install reliably and quickly on the surface of prism 102 without inducing distortion and strain in the silicone layer and anomalies in the interface between the surface of prism 102 and the silicone rubber sheet 104. These distortions, strains, and anomalies may cause unacceptable optical images. If the placement of silicone rubber sheet 104 on prism 102 is anything except perfectly flat, any distortions, strains, or anomalies will be displayed on an image.

Figure 4:
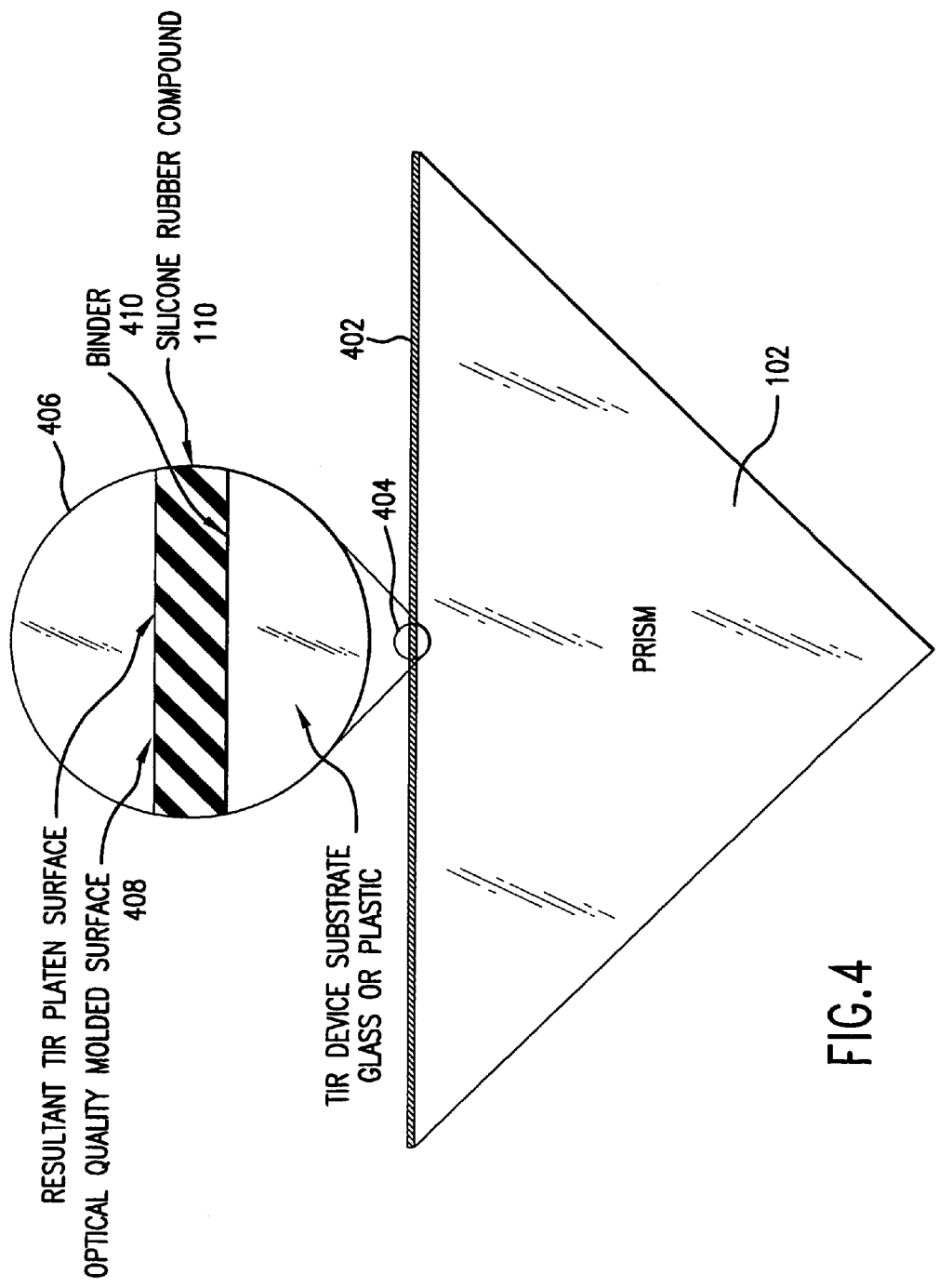
FIG. 4 is a diagram illustrating an optical quality silicone rubber sheet that is bonded to a biometric TIR prism according to an embodiment of the invention.

In another embodiment of the invention, in-situ molding on a prism surface takes advantage of the precision qualities of the molding process while avoiding installation problems that cause distortion and strain in the silicone layer and interfacing anomalies between the prism surface and the silicone rubber sheet. FIG. 4 is a diagram illustrating an optical quality silicone rubber sheet that is bonded to a biometric TIR prism according to an embodiment of the invention. FIG. 4 shows prism 102 with an optical quality silicone rubber sheet 402 bonded to prism 102 using a binder. An enlarged view 406 of a portion 404 of silicone rubber sheet 402 is also shown in FIG. 4. Enlarged view 406 shows the components of silicone rubber sheet 402. The components of silicone rubber sheet 402 include silicone rubber compound 110, one optical quality molded surface 408, and a binder 410.

Quality molded surface 408 has a surface flatness of 4 to 6 waves of light per inch. Quality molded surface 408 is used as a TIR (Total Internal Reflection) platen surface on which a biometric image is formed. Binder 410 is the material used to bond silicone rubber sheet 402 to the surface of prism 102. Thus, in this embodiment, one does not have to attach or worry about attaching silicone rubber sheet 402 to prism 102 because silicone rubber sheet 402 is permanently bonded to the surface of prism 102.

In one embodiment, a liquid silicone primer, SS4120, manufactured by General Electric, is used to bond silicone rubber sheet 402 to prism 102. SS4120 is a very thin material with a viscosity of alcohol. SS4120 has an approximate curing time of one hour before one can use it. Other silicone primers that are clear and remain clear after the primer cures may also be used.

Figure 5:
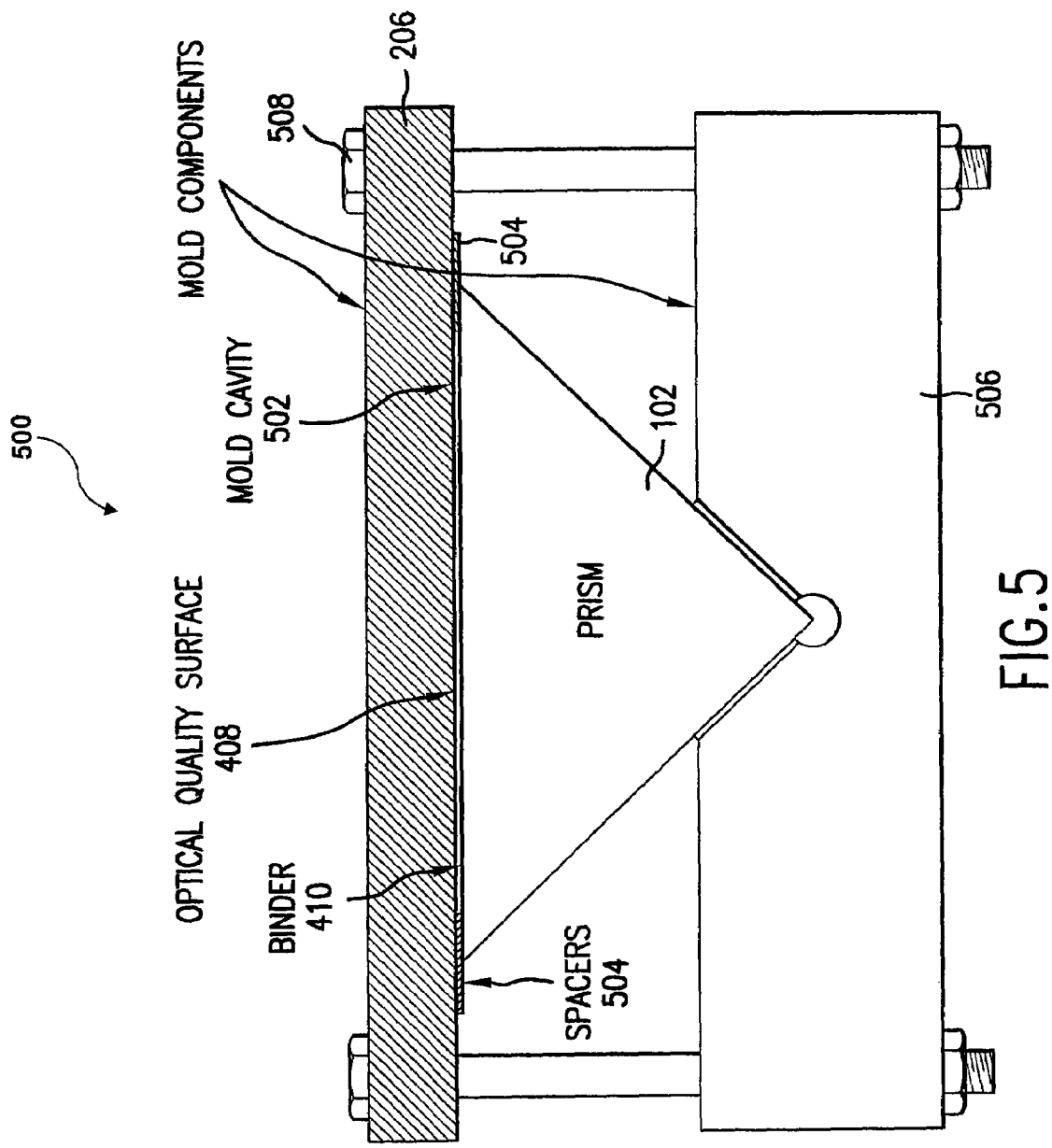
FIG. 5 is a mold for making an optical quality silicone rubber sheet that is bonded to a biometric TIR prism according to an embodiment of the invention.

FIG. 5 is an exemplary mold 500 for making optical quality silicone rubber sheet 402 bonded to biometric TIR prism 102 according to an embodiment of the invention. Mold 500 is comprised of a mold cavity 502, a plurality of spacers 504, two clamps 508, and two plates 206 and 506, respectively. Plate 206 may be a glass or plastic plate for visibility. In one embodiment, plate 206 is a piece of float glass for providing an optically flat surface. Plate 506 may be any type of plate built to hold prism 102.

Spacers 504 are located along three sides of mold cavity 502. Spacers 504 are used to separate prism 102 from plate 206. The thickness of spacers 504 are equivalent to the desired thickness of the silicone rubber sheet to be molded. Clamps 508 are U-shaped and adjustable, and are used to hold the two plates 206 and 506 together. Other types of clamps may be used to hold mold 500 together. Clamps 508 are applied with enough force to prevent leakage of silicone rubber compound 110. Mold cavity 502 is used to hold the liquid silicone rubber compound 110 for making silicone rubber sheet 402.

Figure 6:
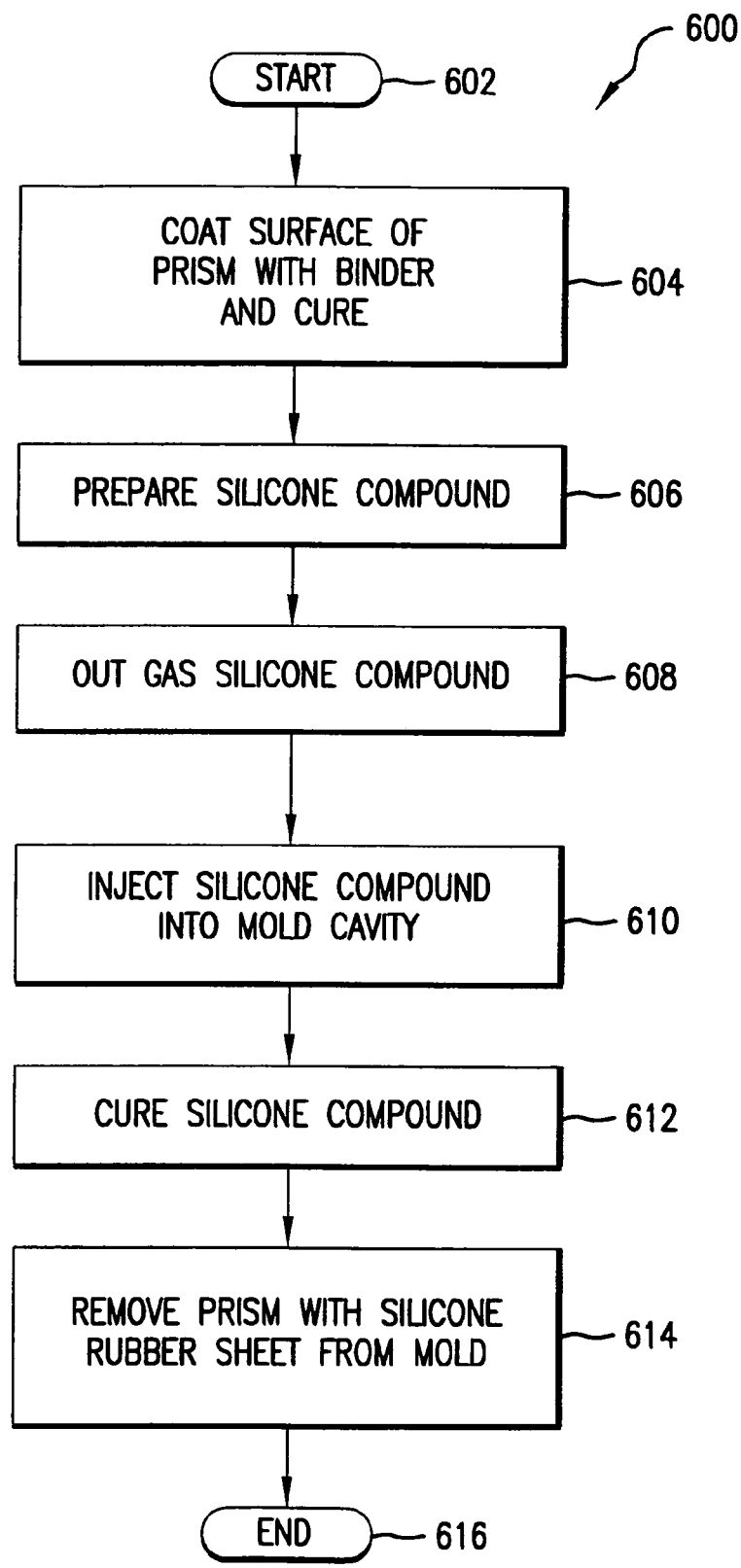
FIG. 6 is a method for making an optical quality silicone rubber sheet that is bonded to a biometric TIR prism according to an embodiment of the invention.

FIG. 6 is a method for making an optical quality silicone rubber sheet that is bonded to a biometric TIR prism according to an embodiment of the invention. The process begins with step 602 and immediately proceeds to step 604.

In step 604, the surface of prism 102 is coated with a liquid silicone primer or binder 410. A thin layer of silicone is applied to the liquid silicone primer as a sealer. Then the liquid silicone primer and thin layer of silicone are cured. In one embodiment, curing time is one hour. Binder 410 enables silicone rubber sheet 402 to adhere to prism 102. The process then proceeds to step 606.

In step 606, silicone rubber compound 110 is prepared. As previously stated, silicone is provided in two parts and the two parts must be mixed together. As previously stated, the present invention uses a liquid silicone, RTV, manufactured by General Electric. In one embodiment, silicone rubber compound 110 is comprised of 100 percent RTV. In another embodiment, silicone rubber compound 110 is silicone, RTV, diluted with a thinner. One embodiment dilutes the silicone with 10 to 40 percent of Toluene to produce silicone rubber compound 110. The process then proceeds to step 608.

In step 608, silicone rubber compound 110 is out gassed. Silicone rubber compound 110 is placed in a vacuum chamber where all of the entrapped air is removed from silicone rubber compound 110. The process then proceeds to step 610.

In step 610, silicone rubber compound 110 is injected into mold cavity 502. The process then proceeds to step 612.

In step 612, silicone rubber compound 110 in mold cavity 502 is cured. Mold 500 is placed into a temperature controlled oven. Silicone rubber compound 110 is cured for a certain amount of time at a specific temperature. Table 1 shows the recommended temperature vs. cure time for curing silicone rubber compound 110. The temperatures and cure times are recommended by General Electric, the manufacturer of RTV.

In one embodiment, silicone rubber compound 110 is cured for 1 hour at temperature 100° C. (212° F.). Other cure times and temperatures shown in Table 1 may be used without departing from the scope of the invention. At the end of the desired cured time, mold 500 is removed from the temperature controlled oven. Curing silicone rubber compound 110 causes the float glass surface of plate 206 to be replicated on the surface of silicone rubber compound 110. The replicated float glass surface forms a TIR surface for the resulting silicone rubber sheet 402. In biometric imaging applications, this surface is used as the TIR platen surface. The process proceeds to step 614.

In step 614, prism 102, now having a bonded silicone rubber sheet 402 adhered to it, is removed from mold 500. Clamps 508 are removed and plate 206 is separated from silicone rubber sheet 402. Prism 102 is then removed from plate 506. The process then proceeds to step 616, where the process ends.

Reinforced Silicone Rubber Sheet

In one embodiment of the present invention, a plastic stiffening material is embedded approximately in the center of two layers of silicone to form a reinforced silicone rubber sheet. The reinforcement serves to both prevent distortion strain during application of the reinforced silicone rubber sheet and to assist with application of the reinforced silicone rubber sheet by the attraction of optically flat surfaces whose flatness is maintained by the stiff reinforcement. These factors, combined with the natural affinity of silicone rubber to a smooth surface, allow adequate optical contact to be achieved by simply placing the reinforced silicone rubber sheet on an adequately clean surface. The attraction between the silicone rubber, the stiff plastic material and glass causes the reinforced silicone rubber sheet to make optical contact with a clean surface, such as a TIR platen surface, almost entirely on its own. When placed on a TIR platen surface, the reinforced silicone rubber sheet becomes an image enhancing, resilient surface with no optically degrading strains or interface irregularities being induced or incurred.

FIG. 7 is a diagram illustrating an optical quality reinforced silicone rubber sheet according to an embodiment of the invention. FIG. 7 shows a prism 102 and an optical quality reinforced silicone rubber sheet 702 attached to, yet separate from, prism 102. An enlarged view 706 of a portion 704 of reinforced silicone rubber sheet 702 is also shown in FIG. 7. Enlarged view 706 shows the components of reinforced silicone rubber sheet 702. The components of reinforced silicone rubber sheet 702 include a stiff plastic material 708 positioned between two layers of silicone rubber compound 110, two binder layers 710, and two parallel optical quality molded surfaces 112. Binder layers 710 bind the two layers of silicone rubber compound 110 with stiff plastic material 708. One of the two parallel optical quality mold surfaces 112 is used to make optical contact with prism 102. The other parallel optical quality mold surface 112 may be used as a TIR platen surface on which a biometric image, such as a fingerprint, a palm print, etc., is formed.

In an embodiment, polycarbonate may be used for stiff plastic material 708. Polycarbonate is a high temperature plastic having high strength. Polycarbonate is very clear, has a high index refraction, and is readily available in thicknesses of 5 to 60 mils. Other types of stiff plastic material that bond to silicone rubber and exhibit good optical quality may be used. Such plastics may include acrylic, CR39, styrene, etc.

The overall thickness of reinforced silicone rubber sheet 702 is directly related to the size of the surface on which it is to be applied. For example, on an approximately 3 by 2 inch surface of a prism for a fingerprint scanner, the thickness may be in the range of 25-30 mils. On an approximately 4 by 6 inch surface of a prism for a palm scanner, the thickness may be in the range of 40-60 mils. Thus, the larger the surface on which reinforced silicone rubber sheet 702 is to be applied, the larger the thickness of reinforced silicone rubber sheet 702. In one embodiment, the overall thickness of reinforced silicone rubber sheet 702 may range from 25 to 100 mils. The thickness of stiff plastic material 708 may range from 5 to 60 mils while the two layers of silicone rubber compound 110 may range from 5 to 50 mils. In one embodiment, the two layers of silicone rubber compound 110 and stiff plastic material 708 are of equal thickness. In another embodiment, the thickness of stiff plastic material 708 may be 50 mils while each layer of silicone rubber compound 110 may be 25 mils. Yet, in another embodiment, the thickness of stiff plastic material 708 may be 10-20 mils while one layer of silicone rubber compound 110 may be 5-15 mils and the other layer of silicone rubber compound 110 may be 10-30 mils.

FIG. 8A is a side view of an exemplary mold 800 for making optical quality reinforced silicone rubber sheet 702 according to an embodiment of the invention. Mold 800 comprises a base 802, a first clamp 804 fixed to, and on one side of, base 802, a post 806 fixed to base 802 on the side opposite of first clamp 804, a spring 808, a moveable clamp 810, a pair of parallel plates 812, a pair of clamps 814 on each side of parallel plates 812, a pair of parallel mold cavities (not shown) for injecting silicone rubber compound 110, and spacers (not shown) located on each end of the pair of mold cavities for indicating the thickness of the two layers of silicone rubber compound 110. As previously indicated, the thicknesses of the two layers of silicone rubber compound 110 may not be equal.

Spring 808, clamps 804 and 810, and post 806 form a tensioning device for tensioning stiff plastic material 708. Parallel plates 812 may be glass or plastic plates for visibility. In one embodiment, parallel plates 812 are pieces of float glass for providing an optically flat surface. Clamps 814 are used to hold the two pieces of float glass 812 together. Clamps 814 are applied with enough force to prevent leakage of the two layers of silicone rubber compound 110. The parallel mold cavities (not shown) are used to hold the liquid silicone compound for making reinforced silicone rubber sheet 702.

FIG. 8B is a top view of mold 800 for making optical quality reinforced silicone rubber sheet 702. FIG. 8B indicates the location of spacers 818.

Figure 9:
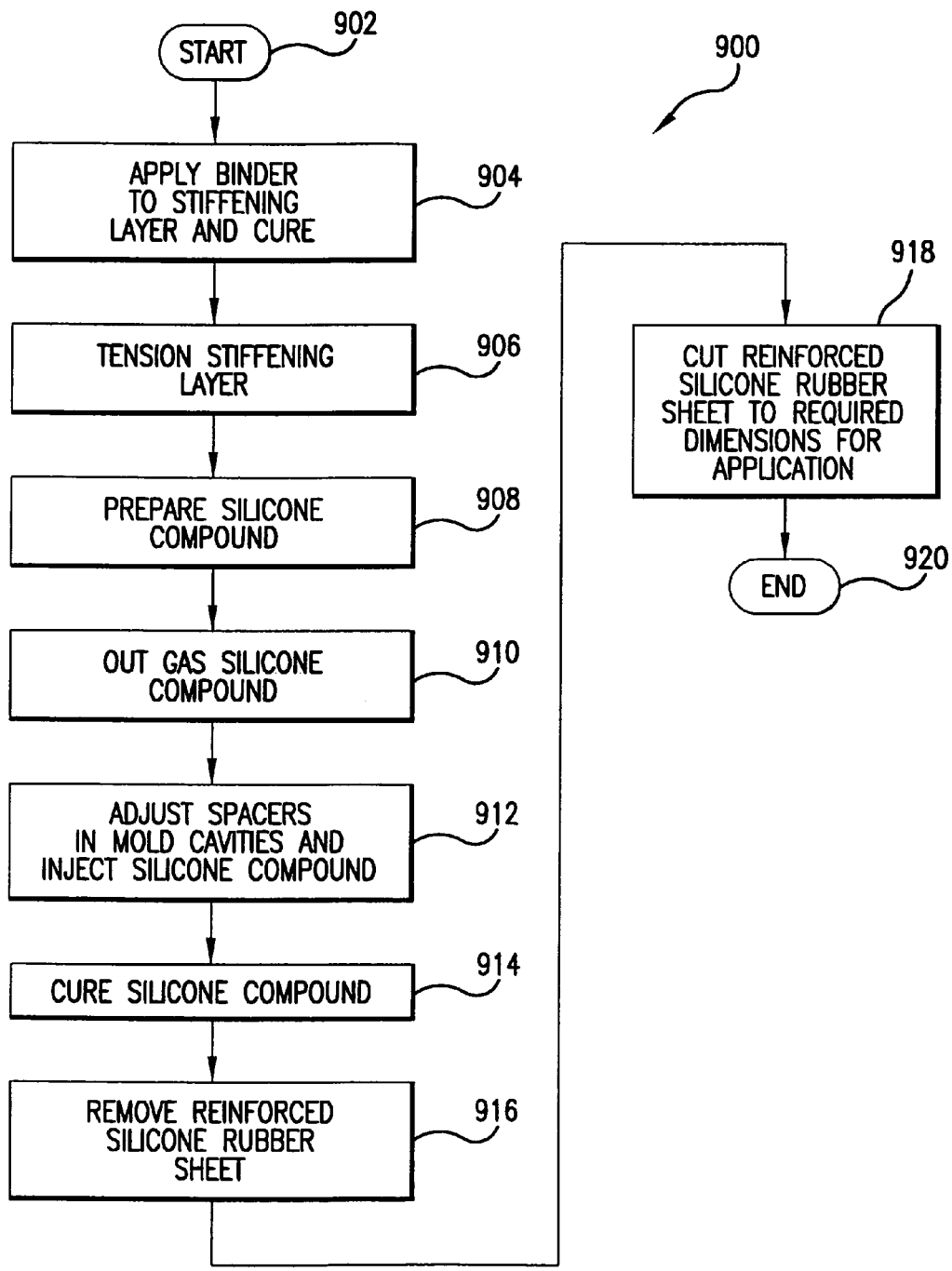
FIG. 9 is a method for making an optical quality reinforced silicone rubber sheet according to an embodiment of the invention.

FIG. 9 is a method for making an optical quality reinforced silicone rubber sheet according to an embodiment of the invention. The process begins with step 902, where the process immediately proceeds to step 904.

In step 904, a binder is applied to a plastic stiffening layer. In one embodiment, the binder is a silicone primer, SS4120, manufactured by General Electric Company. Then a sealer coat of silicone is applied. In one embodiment, the plastic stiffening layer is dipped into the silicone. The plastic stiffening layer is then cured for approximately 1 hour. The process then proceeds to step 906.

In step 906, after curing, the plastic stiffening layer is placed in the tensioning device of mold 800 between plates 812. Each end of the plastic stiffening layer is attached to mold 800 via clamps 804 and 810. To prevent the silicone, in which the plastic stiffening layer was sealed, from being attracted to plates 812 (wherein plates 812 are made of glass), enough tension must be applied to the plastic stiffening layer to prevent it from attaching itself to glass plates 812. Thus, the spring is used to stretch the stiffening layer by a necessary amount to prevent the stiffening layer from attaching itself to one of glass plates 812 and to maintain its position within mold 800. The process then proceeds to step 908.

In step 908, silicone rubber compound 110 is prepared. As previously stated, silicone or RTV is in two parts and the two parts must be mixed together. In one embodiment, silicone rubber compound 110 is comprised of 100 percent RTV. In another embodiment, silicone rubber compound is comprised of RTV diluted with a silicone thinner, Toluene. RTV may be diluted by 10 to 40 percent to produce silicone rubber compound 110. The process then proceeds to step 910.

In step 910, silicone rubber compound 110 is out gassed. Silicone rubber compound 110 is placed in a vacuum chamber to get all of the entrapped air out of silicone rubber compound 110.

In step 912, the spacers are adjusted for the appropriate thickness of the mold cavities. Silicone rubber compound 110 is injected into the two mold cavities for mold 800. The process then proceeds to step 914.

In step 914, silicone rubber compound 110 is cured in mold 800. Mold 800 is placed into a temperature controlled oven. Silicone rubber compound 110 is cured for a certain amount of time at a specific temperature as shown in Table 1.

In one embodiment, silicone rubber compound 110 is cured for 1 hour at temperature 100° C. (212° F.). Other cure times and temperatures shown in Table 1 may be used without departing from the scope of the invention. At the end of the desired cured time, mold 800 is removed from the temperature controlled oven. Curing silicone rubber compound 110 causes the float glass surfaces of plates 812 to be replicated on each outside surface of silicone rubber compound 110. The top surface of silicone rubber compound 110 forms a TIR surface for the resulting reinforced silicone rubber sheet 702. The bottom surface of silicone rubber compound 110 enables reinforced silicone rubber sheet 702 to make optical contact with a surface on which it attaches. The process proceeds to step 916.

In step 916, mold 800 is taken apart in order to remove reinforced silicone rubber sheet 702. Clamps 814, 804, and 810 are removed and plates 812 are separated. The process then proceeds to step 918.

In step 918, reinforced silicone rubber sheet 702 is cut to the desired dimensions for its particular application. Silicone rubber sheet 702 may be cut with a die cutter. Other cutting devices may also be used, such as an exacto knife, shears, etc. The process then proceeds to step 920, where the process ends.

FIG. 10A is an exemplary diagram illustrating a reinforced silicone rubber sheet 1002 for a fingerprint scanner. Reinforced silicone rubber sheet 1002 is comprised of two layers of clear silicone rubber 1004 and one layer of clear polycarbonate 1006 inserted between the two layers of clear silicone rubber 1004. A molded surface is formed on the outside surface of the two layers of clear silicone rubber 1004. A primer/binder binds the inside surface of the two layers of clear silicone rubber 1004 to the layer of clear polycarbonate 1006. Reinforced silicone rubber sheet 1002 is approximately 3.24±0.010 inches by 2.11±0.010 inches and has a thickness of approximately 30±2 mils. Each layer of clear silicone rubber 1004 is 7.5±0.75 mils thick. The layer of clear polycarbonate 1006 is 15±0.75 mils thick. Notes for reinforced silicone rubber sheet 1002 are found in Table 2.

Figure 10B:
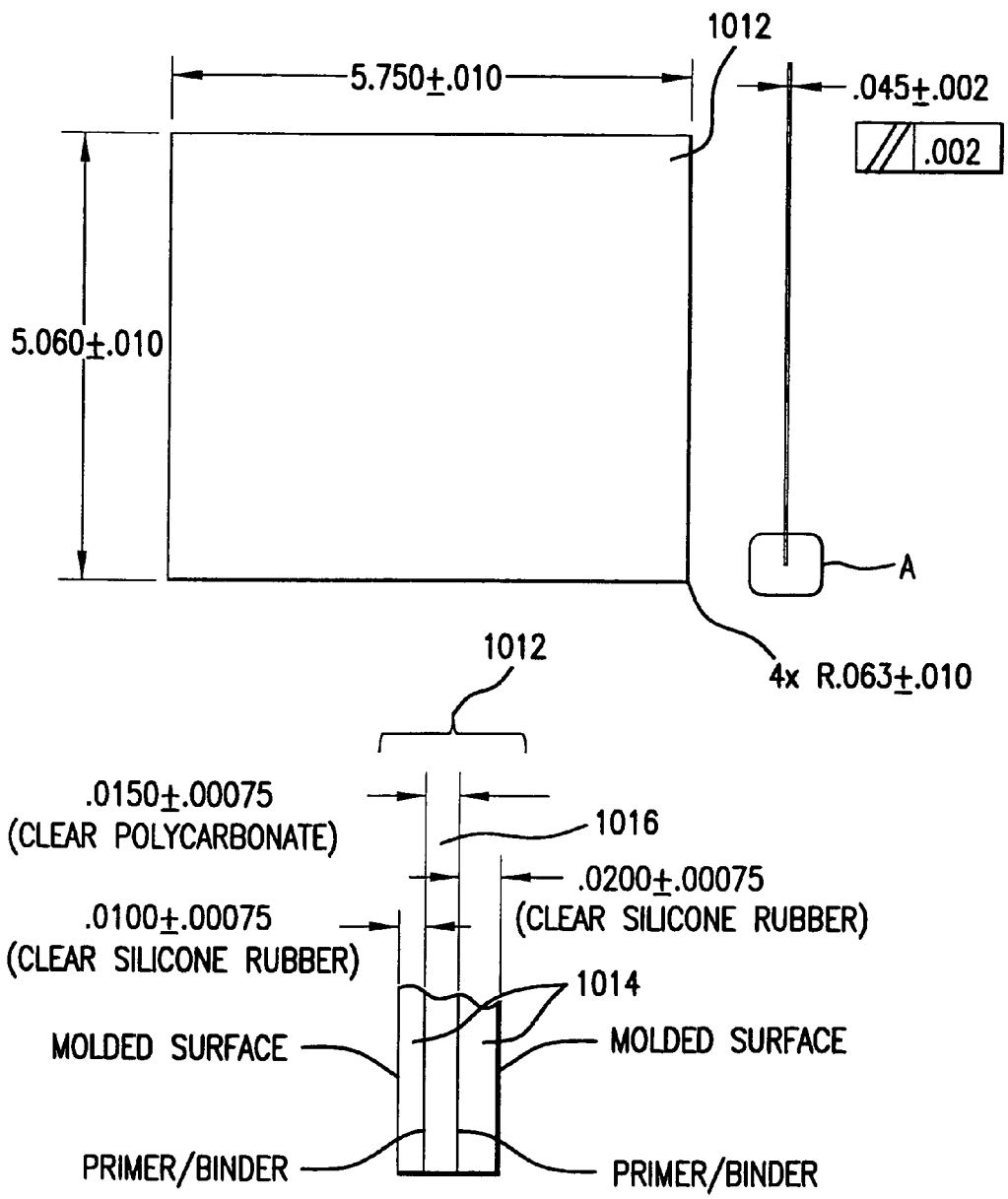
FIG. 10B is an exemplary diagram illustrating an optical quality reinforced silicone rubber sheet for a palm print scanner.

FIG. 10B is an exemplary diagram illustrating a reinforced silicone rubber sheet 1012 for a palm print scanner. Reinforced silicone rubber sheet 1012 is comprised of two layers of clear silicone rubber 1014 and one layer of clear polycarbonate 1016 inserted between the two layers of clear silicone rubber 1014. A molded surface is formed on the outside surface of the two layers of clear silicone rubber 1014. A primer/binder binds the inside surface of the two layers of clear silicone rubber 1014 to the layer of clear polycarbonate 1016. Reinforced silicone rubber sheet 1012 is approximately 5.75±0.010 inches by 5.06±0.010 inches and has a thickness of approximately 45±2 mils. The two layers of clear silicone rubber 1014 are not of equal thickness. One layer of clear silicone rubber 1014 is 10±0.75 mils thick while the other layer of clear silicone rubber 1014 is 20±0.75 mils thick. The layer of clear polycarbonate 1016 is 15±0.75 mils thick. Notes for reinforced silicone rubber sheet 1012 are found in Table 2.

TABLE 2

| NOTES |
|---|
| 1. MOLDED OPTICALLY CLEAR SILICONE RUBBER WITH REINFORCED LAYER OF CLEAR POLYCARBONATE FILM<br>    A) OPTICALLY CLEAR SILICONE RUBBER:<br>        MECHANICAL PROPERTIES AFTER CURING:<br>            HARDNESS: SHORE A DUROMETER: 44-46<br>            TENSILE STRENGTH: 920 PSI<br>            ELONGATION: 120%<br>            SHRINKAGE: 0.20%<br>            REFRACTIVE INDEX: 1.40<br>            COEFFICIENT OF EXPANSION: $15.3 \times 10^{-6}$ IN/IN/° F.<br>    B) CLEAR POLYCARBONATE FILM:<br>        GRADE: GRAPHICS QUALITY<br>        REFRACTIVE INDEX: 1.588<br>        LIGHT TRANSMISSION: 88% MINIMUM<br>        HARDNESS: ROCKWELL R 118<br>        YIELD STRENGTH: 8,500 PSI<br>        ULTIMATE STRENGTH: 9,000 PSI<br>        COEFFICIENT OF EXPANSION: $37.5^{-6}$ IN/IN/° F.<br>        VISUAL DEFECTS: NONE PERMITTED<br>        VISUAL SCRATCHES: NONE PERMITTED<br>    C) PRIMER/BINDER:<br>        OPTICALLY CLEAR PRIMER/BINDER WHICH WILL NOT REDUCE THE OPTICALLY |

TABLE 2-continued

NOTES

CLEARNESS AND TRANSMISSIVITY OF THE FINAL LAMINATE.
A BOND STRENGTH OF 4-10 PSI IN A PEEL CONFIGURATION AND 200-800 PSI IN LAP
SHEAR IS REQUIRED.
D) MOLDED SURFACES:
   TOOLING MOLD SURFACES MUST BE FLAT WITHIN 6-10A PER INCH MAXIMUM, VISIBLE
   LIGHT AND HAVE A SURFACE QUALITY OF 80-50 (EQUIVALENT TO COMMERCIAL QUALITY
   FLOAT GLASS).
E) CLEANLINESS:
   MAINTAIN A CLASS 100 (M3.5) HEPA ENVIRONMENT THROUGHOUT COMPLETE
   FABRICATION; MOLDING PROCESS, TRIMMING TO SIZE, AND FINAL PACKAGING.
F) ACCEPTANCE TESTS:
   VISUAL TEST: NO BUBBLES, INCLUSIONS, OR STRIATIONS PERMITTED.
   TRANSMISSIVITY TEST PER (TBD) METHOD: MINIMUM TRANSMISSIVITY OF (TBD)%
   OVER VISIBLE SPECTRUM.
   FUNCTIONAL TEST: MOLDED SILICONE PAD (AFTER TRIMMING) MUST OPTICALLY
   CONTACT, TO PRODUCE A VISUALLY TRANSPARENT INTERFACE WITH A CLEAN GLASS
   SURFACE. THIS MUST OCCUR OVER 100% OF THE PAD SURFACE AND WITHIN 30 SECONDS,
   AFTER PLACING PAD ON THE GLASS SURFACE, WITHOUT ANY ADDITIONAL
   FORCE/PRESSURE OR WETTING AGENTS.
   GLASS SURFACE MUST CONFORM TO THE SAME SPECIFICATIONS AS SPECIFIED FOR THE
   MOLD SURFACES IN NOTE ID.
   BOND TEST: (TBD) TEST METHOD TO VERIFY PRIMER/BINDER BOND STRENGTH AS
   SPECIFIED IN SECTION 1C.
2. APPLY PROTECTIVE FILM TO BOTH MOLDED SURFACES PRIOR TO TRIMMING PER NOTE 3.
3. ALL EDGES TO BE CLEANLY TRIMMED WITHOUT DISTORTIONS, BURRS, OR TRIMMING DEBRIS; TO
   INSURE FUNCTIONAL ACCEPTANCE TEST PER NOTE IF WILL BE MET.
4. PACKAGE INDIVIDUALLY TO MAINTAIN CLEANLINESS, FLATNESS AND MOLDED SURFACE QUALITY.
5. SAMPLES MUST BE APPROVED.
6. PRODUCTION LOT INSPECTION:
   AN AQL LEVEL SAMPLE WILL BE PERFORMED BY THE QUALITY DEPT. TO VERIFY CONFORMANCE
   TO THE ACCEPTANCE TESTS SPECIFIED IN NOTE 1F.

Although the present invention has been described using silicone, the present invention may also be made using vinyl. In another embodiment of the invention, color, such as a faint red or blue, is added to the silicone rubber and/or stiffening layer to provide an optical bandpass filter for improving ambient light. In yet another embodiment of the invention, once the silicone rubber sheet makes optical contact with a surface, such as, for example, a prism surface, the silicone rubber sheet changes in color.

CONCLUSION

The present invention is not limited to the embodiment of a biometric scanner. The present invention can be used with any system that utilizes a silicone rubber sheet. The previous description of the preferred embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. A total internal reflective (TIR) platen for a biometric imaging device, comprising:
   a first layer of silicone rubber compound having an optical quality surface;
   a second layer of silicone rubber compound having an optical quality surface;
   a layer of stiff plastic embedded between the first layer of silicone rubber and the second layer of silicone rubber,
   wherein the optical quality surface of the first layer of silicone rubber compound provides for a total internal reflective platen surface and the optical quality surface of the second layer of silicone rubber compound provides for making optical contact with a prism.

2. The TIR platen of claim 1, wherein the optical quality surface of the second layer of silicone rubber compound is attached to the prism.

3. The TIR platen of claim 1, wherein the optical quality surface of the second layer of silicone rubber compound is integrally molded to the prism.

4. The TIR platen of claim 1, further comprising:
   a first binder layer positioned between the first layer of silicone rubber and the layer of stiff plastic, wherein the first layer of silicone rubber is bound to the layer of stiff plastic; and
   a second binder layer positioned between the second layer of silicone rubber and the layer of stiff plastic, wherein the second layer of silicone rubber is bound to the layer of stiff plastic.

5. The TIR platen of claim 1, wherein the layer of stiff plastic comprises at least one of: polycarbonate, acrylic, CR39, or styrene.

* * * * *